United States Patent
Menon et al.

(10) Patent No.: US 12,231,327 B2
(45) Date of Patent: *Feb. 18, 2025

(54) REVERSE FORWARDING INFORMATION BASE ENFORCEMENT

(71) Applicant: 128 Technology, Inc., Burlington, MA (US)

(72) Inventors: Abilash Menon, Boxborough, MA (US); Robert Penfield, Concord, MA (US); Hadriel S. Kaplan, Nashua, NH (US)

(73) Assignee: 128 Technology, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,800

(22) Filed: Jun. 13, 2023

(65) Prior Publication Data

US 2023/0327984 A1 Oct. 12, 2023

Related U.S. Application Data

(63) Continuation of application No. 17/305,985, filed on Jul. 19, 2021, now Pat. No. 11,722,405, which is a
(Continued)

(51) Int. Cl.
*H04L 45/00* (2022.01)
*H04L 47/32* (2022.01)
*H04L 49/00* (2022.01)

(52) U.S. Cl.
CPC .............. *H04L 45/36* (2013.01); *H04L 47/32* (2013.01); *H04L 49/309* (2013.01)

(58) Field of Classification Search
CPC ....... H04L 45/36; H04L 45/38; H04L 45/745; H04L 47/32; H04L 49/309
See application file for complete search history.

(56) References Cited

U.S. PATENT DOCUMENTS 6,515,963 B1 2/2003 Bechtolsheim et al.
6,563,824 B1 5/2003 Bhatia et al.
(Continued)

FOREIGN PATENT DOCUMENTS

CN 101552703 A 10/2009
CN 101646220 A 2/2010
(Continued)

OTHER PUBLICATIONS

"A case for stateful forwarding plane", Computer Communications, Elsevier, vol. 36, No. 7, pp. 779-791, Apr. 2013.
(Continued)

*Primary Examiner* — Jae Y Lee
*Assistant Examiner* — Hector Reyes
(74) *Attorney, Agent, or Firm* — Shumaker & Sieffert, P.A.

(57) ABSTRACT

In exemplary embodiments of the present invention, a router determines whether or not to establish a stateful routing session based on the suitability of one or more candidate return path interfaces. This determination is typically made at the time a first packet for a new session arrives at the router on a given ingress interface. In some cases, the router may be configured to require that the ingress interface be used for the return path of the session, in which case the router may evaluate whether the ingress interface is suitable for the return path and may drop the session if the ingress interface is deemed by the router to be unsuitable for the return path. In other cases, the router may be configured to not require that the ingress interface be used for the return path, in which case the router may evaluate whether at least one interface is suitable for the return path and drop the session if no interface is deemed by the router to be suitable for the return path.

18 Claims, 28 Drawing Sheets

Related U.S. Application Data continuation of application No. 15/169,003, filed on May 31, 2016, now Pat. No. 11,075,836.

(56) References Cited

U.S. PATENT DOCUMENTS

| | | |
|---|---|---|
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,492,713 B1 | 2/2009 | Turner et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 7,949,785 B2 | 5/2011 | Alkhatib et al. |
| 8,068,417 B1 | 11/2011 | Roberts |
| 8,094,560 B2 | 1/2012 | Bagepalli et al. |
| 8,139,479 B1 | 3/2012 | Raszuk |
| 8,316,435 B1 * | 11/2012 | Varadhan ............... H04L 45/60 726/2 |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,699,373 B1 | 4/2014 | Pani |
| 8,705,524 B1 | 4/2014 | Kelly et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,246,800 B1 | 1/2016 | Ramamoorthi et al. |
| 9,276,864 B1 | 3/2016 | Vincent |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 11,075,836 B2 | 7/2021 | Menon et al. |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0176363 A1 | 11/2002 | Durinovic-Johri et al. |
| 2003/0198189 A1 | 10/2003 | Roberts et al. |
| 2003/0214938 A1 | 11/2003 | Jindal et al. |
| 2004/0004955 A1 | 1/2004 | Lewis |
| 2004/0088542 A1 | 5/2004 | Daude et al. |
| 2004/0264481 A1 | 12/2004 | Darling et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0146813 A1 | 7/2006 | Biswas et al. |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2007/0253418 A1 | 11/2007 | Shiri et al. |
| 2008/0159145 A1 | 6/2008 | Muthukrishnan et al. |
| 2008/0214175 A1 | 9/2008 | Papadoglou et al. |
| 2009/0007021 A1 | 1/2009 | Hayton |
| 2009/0059958 A1 | 3/2009 | Nakata |
| 2010/0125898 A1 | 5/2010 | Dubuc et al. |
| 2010/0191968 A1 | 7/2010 | Patil et al. |
| 2011/0007743 A1 | 1/2011 | Kuwahara et al. |
| 2011/0069714 A1 * | 3/2011 | Le Pennec ............... H04L 45/36 370/401 |
| 2011/0299554 A1 | 12/2011 | Ros-Giralt et al. |
| 2012/0144061 A1 | 6/2012 | Song |
| 2012/0236860 A1 | 9/2012 | Kompella et al. |
| 2013/0088994 A1 | 4/2013 | Guo et al. |
| 2013/0194971 A1 * | 8/2013 | Montessoro ............ H04L 45/34 370/254 |
| 2013/0227166 A1 | 8/2013 | Ravindran et al. |
| 2013/0229922 A1 | 9/2013 | Li et al. |
| 2013/0230051 A1 | 9/2013 | Lockwood |
| 2013/0297824 A1 | 11/2013 | Lan et al. |
| 2014/0040488 A1 | 2/2014 | Small et al. |
| 2015/0117454 A1 | 4/2015 | Koponen et al. |
| 2015/0188814 A1 | 7/2015 | Jain et al. |
| 2015/0215841 A1 | 7/2015 | Hsu et al. |
| 2015/0229618 A1 | 8/2015 | Wan et al. |
| 2015/0372898 A1 | 12/2015 | Haramaty et al. |
| 2015/0372916 A1 | 12/2015 | Haramaty et al. |
| 2015/0381324 A1 | 12/2015 | Mirsky et al. |
| 2016/0036694 A1 | 2/2016 | Abdul et al. |
| 2016/0094444 A1 | 3/2016 | MeLampy et al. |
| 2016/0105471 A1 | 4/2016 | Nunes et al. |
| 2016/0119089 A1 | 4/2016 | Zhang |
| 2016/0164780 A1 | 6/2016 | Timmons et al. |
| 2016/0269284 A1 | 9/2016 | Cheng et al. |
| 2016/0344565 A1 | 11/2016 | Batz et al. |
| 2016/0344715 A1 | 11/2016 | Kumar et al. |
| 2016/0344803 A1 | 11/2016 | Batz et al. |
| 2017/0063681 A1 | 3/2017 | Kaplan et al. |
| 2017/0063927 A1 | 3/2017 | Schultz et al. |
| 2017/0171110 A1 | 6/2017 | Gosselin et al. |
| 2017/0250906 A1 | 8/2017 | MeLampy et al. |
| 2021/0336878 A1 * | 10/2021 | Vastholil ............ H04L 43/0876 |
| 2021/0344593 A1 | 11/2021 | Menon et al. |
| 2021/0409336 A1 * | 12/2021 | Talur ................... H04L 67/564 |

FOREIGN PATENT DOCUMENTS

| | | |
|---|---|---|
| CN | 101068242 B | 4/2010 |
| CN | 102158371 A | 8/2011 |
| CN | 102594600 | 7/2012 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1418705 | 4/2006 |
| EP | 1313267 B1 | 12/2006 |
| EP | 2339784 | 6/2011 |
| GB | 1473898 A | 5/1977 |
| KR | 10-2011-0062994 A | 6/2011 |
| WO | 2007/084707 A2 | 7/2007 |
| WO | 2007/084755 A2 | 7/2007 |
| WO | 2008/043230 A1 | 4/2008 |
| WO | 2015/131537 A1 | 9/2015 |

OTHER PUBLICATIONS

"Active queue management", https://en.wikipedia.org/wiki/Active_queue_management, 2 pages, Apr. 22, 2015.

"Design, Implementation and Performance of a Content-Based Switch", In INFOCOM 2000, Proceedings of the Nineteenth Annual Joint Conference of the IEEE Computer and Communications Societies, Tel Aviv, Israel, 10 pages, Mar. 26-30, 2000.

"Internet Protocol," Darpa Internet Program Protocol Specification, Information Sciences Institute, RFC 791, Sep. 1981, 51 pp.

"Network architecture for joint failure recovery and traffic engineering", SIGMETRICS '11, Proceedings of the ACM SIGMETRICS Joint International Conference on Measurement and Modeling of

(56) References Cited

OTHER PUBLICATIONS

Computer Systems, San Jose, CA, USA, pp. 97-108, Jun. 7-11, 2011.
"Transmission Control Protocol," Darpa Internet Program Protocol Specification, Information Sciences Institute, RFC 793, Sep. 1981, 91 pp.
1.2 Overview of a TCP communications session, RPG IV Socket Tutorial (http://www.scottklement.com/rug/socketut/overview), 2 pages, 2001. Applicant points out in accordance with MPEP 609.04(a) that the 2001 year of publication is sufficiently earlier than the effective U.S. filing date of the present application, and any foreign priority date that the particular month of publication is not in issue.
1Pv6 Segment Routing Header (SRH), Network Working Group, Draft, 24 pages, Jul. 3, 2014.
A Technique for Low Energy Mapping and Routing in Network-on-Chip Architectures, ISLPED '05 Proceedings of the 2005 International Symposium on Low Power Electronics and Design, 6 pages, Aug. 8-10, 2005.
A Unified Approach to Constrained Mapping and Routing on Network-on-Chip Architectures, CODES+ISSS '05 Proceedings of the 3rd IEEE/ACM/IFIP International Conference on Hardware/Software Codesign and System Synthesis, 6 pages, Sep. 19-21, 2005.
Bidirectional Forwarding Detection (BFD), Internet Engineering Task Force (IETF), Request for Comments 5880, ISSN: 2070-1721, Juniper Networks, 49 pages, Jun. 2010.
Deering et al., "Internet Protocol, Version 6 (IPv6) Specification," Network Working Group, RFC 2460, Dec. 1998, 39 pp.
Definition of TCP/IP abc's, PC Magazine Encyclopedia (www.pcmag.com/encyclopedia/term/52615), 5 pages, 2005. Applicant points out in accordance with MPEP 609.04(a) that the 2005 year of publication is sufficiently earlier than the effective U.S. filing date of the present application, and any foreign priority date that the particular month of publication is not in issue.
Equal-cost multi-path routing, 1 page, dated Sep. 12, 2013.
Functional Requirements for Uniform Resource Names, Network Working Group, Request for Comments 1737, 7 pages, Dec. 1994.
International Preliminary Report on Patentability from International Application No. PCT/US2017/032905, mailed Dec. 4, 2018, 4 pp.
International Search Report—International Application No. PCT/US2017/032478, dated Aug. 24, 2017, together with the Written Opinion of the International Searching Authority, 9 pages.
International Search Report—International Application No. PCT/US2017/032702, dated Aug. 17, 2017, together with the Written Opinion of the International Searching Authority, 8 pages.
International Search Report—International Application No. PCT/US2017/032907, dated Aug. 3, 2017, together with the Written Opinion of the International Searching Authority, 8 pages.
International Search Report—International Application No. PCT/US2017/032905, dated Sep. 3, 2017, together with the Written Opinion of the International Searching Authority, 9 pages.
International Search Report—Application No. PCT/US2016/026938, dated Jul. 28, 2016, together with the Written Opinion of the International Searching Authority, 9 pages.
International Search Report—International Application No. PCT/2015/044815, dated Dec. 6, 2015, together with the Written Opinion of the International Searching Authority, 8 pages.
International Search Report—International Application No. PCT/US2015/060840, dated Mar. 8, 2016, together with the Written Opinion of the International Searching Authority, 13 pages.
International Search Report—International Application No. PCT/US2016/013416, dated Jun. 8, 2016, together with the Written Opinion of the International Searching Authority, 12 pages.
Introduction to Receive Side Scaling, Developer Resources, https://msdn.microsoft.com/enus/library/windows/hardware/ff556942(v=vs.85).aspx, 3 pages, Apr. 2014.
LAN switching, 5 pages, dated Jun. 12, 2013.
Layer 3 Switches Explained, Happy Router, 6 pages, dated Aug. 30, 2007.
Making Better Use of All Those TCP ACK Packets, Computer Science Department, Worcester Polytechnic Institute, 10 pages, 2005. Applicant points out in accordance with MPEP 609.04(a) that the 2005 year of publication is sufficiently earlier than the effective U.S. filing date of the present application, and any foreign priority date that the particular month of publication is not in issue.
Management information base, 6 pages, dated Jul. 15, 2013.
Multi-queue network interfaces with SMP on Linux, Greenhost, https://greenhost.net/2013/04/10/multi-gueue-network- interfaces-with-smp-on-linux/, 5 pages, Apr. 10, 2013.
Network address translation, 11 pages, dated Sep. 24, 2013.
Network Functions Virtualisation—Introductory White Paper, Issue 1, at the "SDN and OpenFlow World Congress", Darmstadt-Germany, (http://portal.etsi.org/nfv/nfv_white_paper), 16 pages, dated Oct. 22, 2012.
Network interface controller, https://en.wikipedia.org/wiki/Network_interface_controller, 5 pages, May 19, 2015.
Network socket, 4 pages, dated Sep. 19, 2013.
Non-RSS Receive Processing, Developer Resources, https://msdn.microsoft.com/enus/library/windows/hardware/ff568798(v=vs.85).aspx, 2 pages, Jan. 2015.
Observing routing asymmetry in Internet traffic, (www.caida.org/research/traffic-analysis/asvmmetry/1 ), 7 pages, dated Jul. 17, 2013.
Open vSwitch, 2 pages, dated Nov. 24, 2013.
Parallel Express Forwarding on the Cisco 10000 Series, (White Paper) Cisco Systems, 4 pages, printed Jun. 17, 2015.
Postel, " User Datagram Protocol," RFC 768, Aug. 28, 1980, 3 pp.
Programmer's Guide, Release 16.04.0, 216 pages, Apr. 12, 2016.
Prosecution History from U.S. Appl. No. 15/169,003, dated Dec. 28, 2017 through Mar. 24, 2021, 160 pp.
Prosecution History from U.S. Appl. No. 17/305,985, dated Nov. 16, 2021 through Mar. 21, 2023, 19 pp.
Reverse path forwarding, 3 pages, dated Jul. 31, 2013.
Router (computing), 8 pages, dated Sep. 23, 2013.
RSS with a Single Hardware Receive Queue, Developer Resources, https://msdn.microsoft.com/enus/library/windows/hardware/ff570727(v=vs.85).aspx, 2 pages, Jan. 2015.
RSS with Hardware Queuing, Developer Resources, https://msdn.microsoft.com/enus/library/windows/hardware/ff570728(v=vs.85).aspx, 2 pages, Jan. 2015.
Segment Routing Architecture, Network Working Group, Draft, 28 pages, Oct. 21, 2013.
Software-defined networking, 6 pages, dated Sep. 16, 2013.
The Next Generation of IP-Flow Routing, SSGRR 2003S International Conference, L'Aquila, Italy, 11 pages, Jul. 29, 2003.
Transmission Control Protocol (TCP) Parameters, (www.iana.org/assignments/tcp-parameters/tcpparameters.xhtm), 5 pages, dated Sep. 22, 2014.
Transmission Control Protocol, 18 pages, dated Sep. 16, 2013.
Uniform Resource Identifier (URI): Generic Syntax, Network Working Group, Request for Comments 3986, The Internet Society, 61 pages, Jan. 2005.
What is routing table? Posted by Margaret Rouse (http://searchnetworking.techtarget.com/definition/routing-table), 5 pages, Apr. 2007.
Xps: Transmit Packet Steering, Eklektix, Inc., 11 pages, Oct. 26, 2010.
YANG—A Data Modeling Language for the Network Configuration Protocol (NETCONF), Internet Engineering Task Force (IETF), Request for Comments 6020, ISSN: 2070-1721, 173 pages, Oct. 2010.

\* cited by examiner

AIPR 1   708

Session X

Return Association (RA)

SSA   1.1.1.1

SSP   10

SDA   5.5.5.5

SDP   20

SPR   100

Forward Association (FA)

SSA   2.2.2.2      (implicit)

SSP   30      (session source port assigned by AIPR 1  708)

SDA   3.3.3.3      (next node address - AIPR 2  714)

SDP   40      (session destination port assigned by AIPR 1  708)

SPR   100

Flag = First Waypoint AIPR

Session Y

RA

FA

Flag

Session Z

RA

FA

Flag

*FIG. 9*

AIPR 2   714

Session X

Return Association (RA)

SSA   2.2.2.2

SSP   30

SDA   3.3.3.3        (implicit)

SDP   40

SPR   100

Forward Association (FA)

SSA   3.3.3.3        (implicit)

SSP   50            (session source port assigned by AIPR 2  714)

SDA   4.4.4.4        (next node address - AIPR 4  722)

SDP   60            (session destination port assigned by AIPR 2  714)

SPR   100

Flag = Intermediate Waypoint AIPR

Session Y

RA

FA

Flag

Session Z

RA

FA

Flag

*FIG. 10*

AIPR 4    722

Session X

Return Association (RA)

SSA   3.3.3.3

SSP   50

SDA   4.4.4.4       (implicit)

SDP   60

SPR   100

Forward Association (FA)

SSA   1.1.1.1       (original source address from metadata)

SSP   10            (original source port from metadata)

SDA   5.5.5.5       (original destination address from metadata)

SDP   20            (original destination port from metadata)

SPR   100

Flag = Final Waypoint AIPR

Session Y

RA

FA

Flag

Session Z

RA

FA

Flag

*FIG. 11*

REVERSE FORWARDING INFORMATION BASE ENFORCEMENT

This application is a continuation of U.S. patent application Ser. No. 17/305,985, filed Jul. 19, 2021, which is a continuation of U.S. patent application Ser. No. 15/169,003, filed May 31, 2016, the entire content of which is herein incorporated by reference.

CROSS-REFERENCE TO RELATED APPLICATION(S)

This patent application is related to U.S. patent application Ser. No. 14/497,954 filed Sep. 26, 2014, entitled, "NETWORK PACKET FLOW CONTROLLER," the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," the disclosure of which is incorporated herein, in its entirety, by reference.

This patent application also is related to U.S. patent application Ser. No. 14/963,999, filed Dec. 9, 2015, entitled, "ROUTER WITH OPTIMIZED STATISTICAL FUNCTIONALITY," the disclosure of which is incorporated herein, in its entirety, by reference.

This patent application also is related to U.S. patent application Ser. No. 14/833,571, filed Aug. 24, 2015, entitled, "Network Packet Flow Controller with Extended Session Management," the disclosure of which is incorporated herein, in its entirety, by reference.

This patent application also is related to U.S. patent application Ser. No. 15/054,781, filed Feb. 26, 2016, entitled, "NAME-BASED ROUTING SYSTEM AND METHOD," the disclosure of which is incorporated herein, in its entirety, by reference.

This patent application is also related to U.S. patent application Ser. No. 15/168,877, filed May 31, 2016, entitled "LINK STATUS MONITORING BASED ON PACKET LOSS DETECTION," the disclosure of which is incorporated herein, in its entirety, by reference.

TECHNICAL FIELD

The present invention relates to data routing and, more particularly, to reverse forwarding information base enforcement in a communication system.

BACKGROUND

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header in accordance with an Internet routing protocol such as BGP, OSPFv2, IS-IS, etc. Among other benefits, this routing scheme enables network devices to forward different packets of a single datagram along different routes to reduce network congestion, or avoid malfunctioning network devices. Those skilled in the art thus refer to IP as a "stateless" protocol because, among other reasons, it does not save packet path data, and does not pre-arrange transmission of packets between end points.

Current Internet routing protocols generally cannot route packets from an element in one private network to an element in another private network because the IP address spaces used for elements in those private networks often overlap. These are often referred to as "unroutable" addresses, which are not useful on the public Internet.

Therefore, Network Address Translation (NAT) is often used to convert between local addresses used for routing within the private networks and public Internet addresses used for routing over the public Internet. The public Internet address is used to route packets between the private networks. Within each private network, other information in the packet is used to determine the local address used to route the packet to the destination entity within the destination private network.

Over the past decade, network challenges have evolved from bandwidth and broadband availability to security and mobility. Cloud has emerged as a primary service delivery architecture that achieves economies of scale unheard of in the past. Cloud embraces sharing of resources, including computing and storage. This has created a huge number of new requirements unmet by today's IP routing models, such as:

Private-network to private-networking models
Dynamically-arranged, service-specific Quality of Service
Unified IPv4 and IPv6 routing tables
Authenticated directional routing
On-the-fly encryption
Overlapping address support
Load balancing instead of equal-cost multipath (ECMP)
Integrated DPI and resulting flow analytics To meet these requirements, current architectures require middleboxes (e.g., firewalls, DPI devices, load balancers) mixed with overlay networking (e.g., VLANs, nested VLANs, VxLANs, MPLS, Cisco ACI, VMware NSX, Midonet) and orchestration (e.g., OpenStack, service function chaining).

SUMMARY

In accordance with one embodiment, a method of managing stateful routing sessions by a router involves receiving, by the router, a first packet for a new stateful routing session on an ingress interface of the router; analyzing, by the router, at least one candidate interface for suitability for a return path for the session; when at least one candidate interface is a suitable candidate interface for the return path for the session, establishing the stateful routing session using a suitable candidate interface for the return path for the session; and when no candidate interface is a suitable candidate interface for the return path for the session, dropping the session.

In accordance with another embodiment, a router comprises a plurality of communication interfaces, a computer storage, and a packet router configured to implement method of managing stateful routing sessions involving receiving, by the packet router, a first packet for a new stateful routing session on an ingress interface of the router; analyzing, by the packet router, at least one candidate interface for suitability for a return path for the session; when at least one candidate interface is a suitable candidate interface for the return path for the session, establishing the stateful routing session using a suitable candidate interface for the return path for the session; and when no candidate interface is a suitable candidate interface for the return path for the session, dropping the session.

In accordance with another embodiment, a computer program product comprising a tangible, non-transitory computer readable medium has embodied therein a computer program that, when run on at least one computer processor, implements a packet router for a router, the packet router implementing a method of managing stateful routing sessions by a router involving receiving a first packet for a new stateful routing session on an ingress interface of the router; analyzing at least one candidate interface for suitability for a return path for the session; when at least one candidate interface is a suitable candidate interface for the return path for the session, establishing the stateful routing session using a suitable candidate interface for the return path for the session; and when no candidate interface is a suitable candidate interface for the return path for the session, dropping the session.

In various alternative embodiments, the at least one candidate interface may consist of the ingress interface. In other embodiments, the at least one candidate interface may comprise the ingress interface and/or at least one interface other than the ingress interface. In some embodiments, when a plurality of candidate interfaces are suitable candidate interfaces, one of the suitable candidate interfaces may be selected for return path for the session. Analyzing at least one candidate interface for suitability for a return path for the session may involve maintaining a reverse forwarding information database that stores performance information for each router interface and referencing the reverse forwarding information database to determine suitability. The at least one candidate interface may include a plurality of candidate interfaces, in which case analyzing at least one candidate interface for suitability for a return path for the session may involve referencing the reverse forwarding information database to determine a best suitable candidate interface from among the plurality of candidate interfaces.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with a first waypoint AIPR based on the lead packet processing of FIG. 8, in accordance with one exemplary embodiment.

FIG. 10 is a schematic diagram showing session-related data associated with an intermediate waypoint AIPR based on the lead packet processing of FIG. 8, in accordance with one exemplary embodiment.

FIG. 11 is a schematic diagram showing session-related data associated with a final waypoint AIPR based on the lead packet processing of FIG. 8, in accordance with one exemplary embodiment.

DETAILED DESCRIPTION

In exemplary embodiments of the present invention, a router determines whether or not to establish a stateful routing session based on the suitability of one or more candidate return path interfaces. This determination is typically made at the time a first packet for a new session arrives at the router on a given ingress interface. In some cases, the router may be configured to require that the ingress interface be used for the return path of the session, in which case the router may evaluate whether the ingress interface is suitable for the return path and may drop the session if the ingress interface is deemed by the router to be unsuitable for the return path. In other cases, the router may be configured to not require that the ingress interface be used for the return path, in which case the router may evaluate whether at least one interface is suitable for the return path and drop the session if no interface is deemed by the router to be suitable for the return path.

Networks

Illustrative embodiments preferably are implemented within an otherwise conventional computer network that uses common networking devices and protocols. Among other things, a network includes at least two nodes and at least one communication link between the nodes. Nodes can include computing devices (sometimes referred to as hosts or devices) and routers. Computers can include personal computers, smart phones, television "cable boxes," automatic teller machines (ATMs) and many other types of equipment that include processors and network interfaces. Links can include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
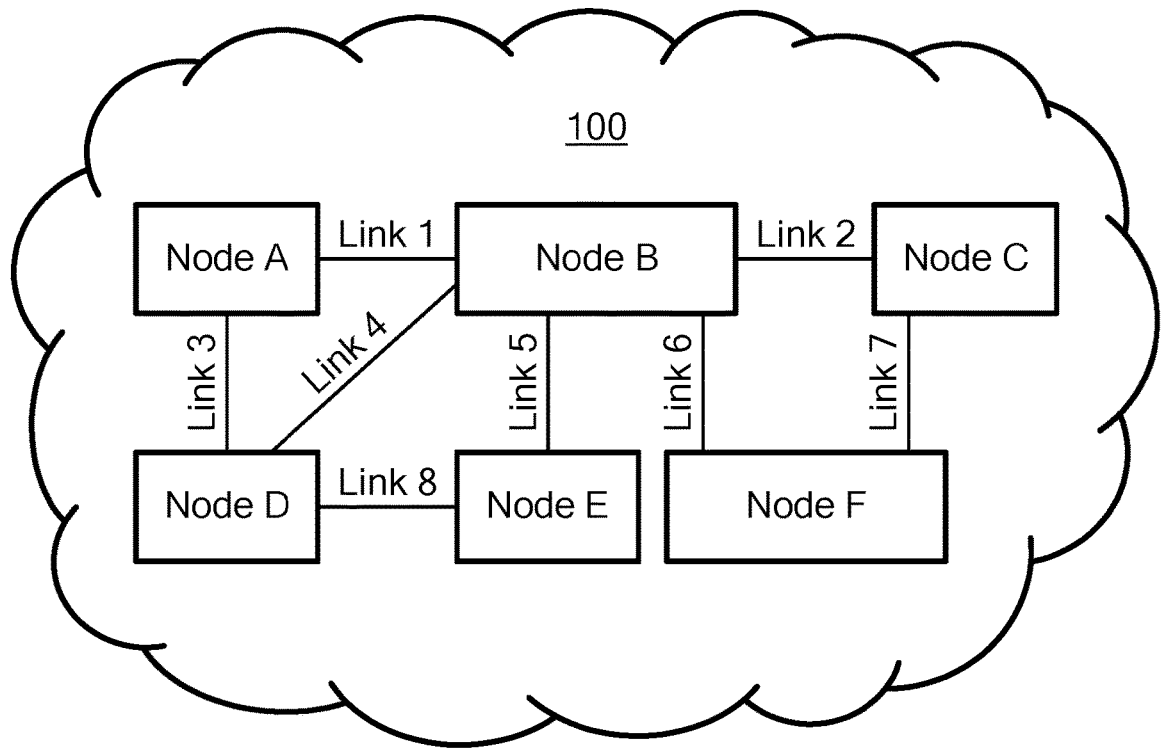
FIG. 1 schematically shows a hypothetical prior art network that may implement certain illustrative embodiments of the invention.

A node can be directly connected to one or more other nodes, each via a distinct communication link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Nodes A-F and all the links 1-8 together make up a network 100. For simplicity, a network is depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of a sending node (the "source address") and the network address of an intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Another commonly used Transport Layer protocol is the User Datagram Protocol (UDP). Each layer performs a logical function and abstracts the layer below it, therefore hiding details of the lower layer. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit source and destination IP addresses, whereas IPv6 utilizes 128-bit source and destination IP addresses. TCP is described generally in IETF RFC 793, which is hereby incorporated herein by reference in its entirety. UDP is described generally in IETF RFC 768, which is hereby incorporated herein by reference in its entirety.

Figure 2:
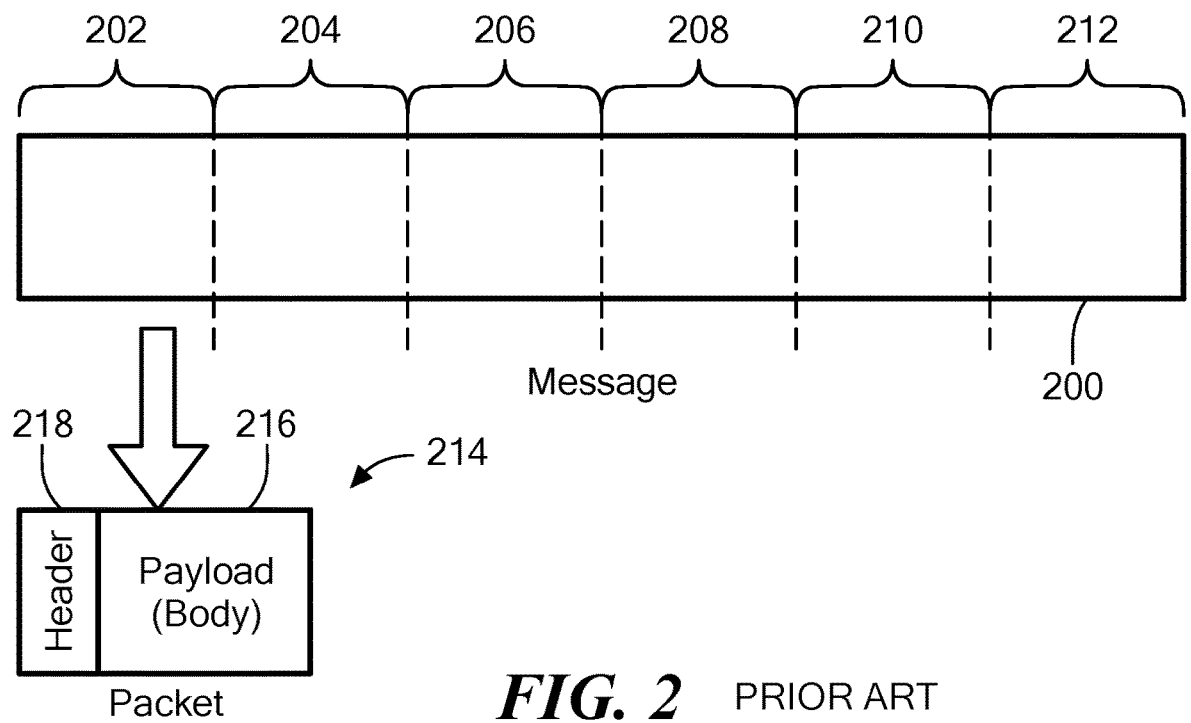
FIG. 2 schematically illustrates a prior art technique for fragmenting a message.

For example, a Layer 3 message may be fragmented into smaller Layer 2 packets if Layer 2 (Data Link Layer) cannot handle the Layer 3 message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol can fragment Layer 4 (Transport Layer) messages into segments, officially referred to as TCP protocol data units (PDUs), if Layer 3 (Network Layer) cannot handle the Layer 4 (Transport Layer) message as one transmission. Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
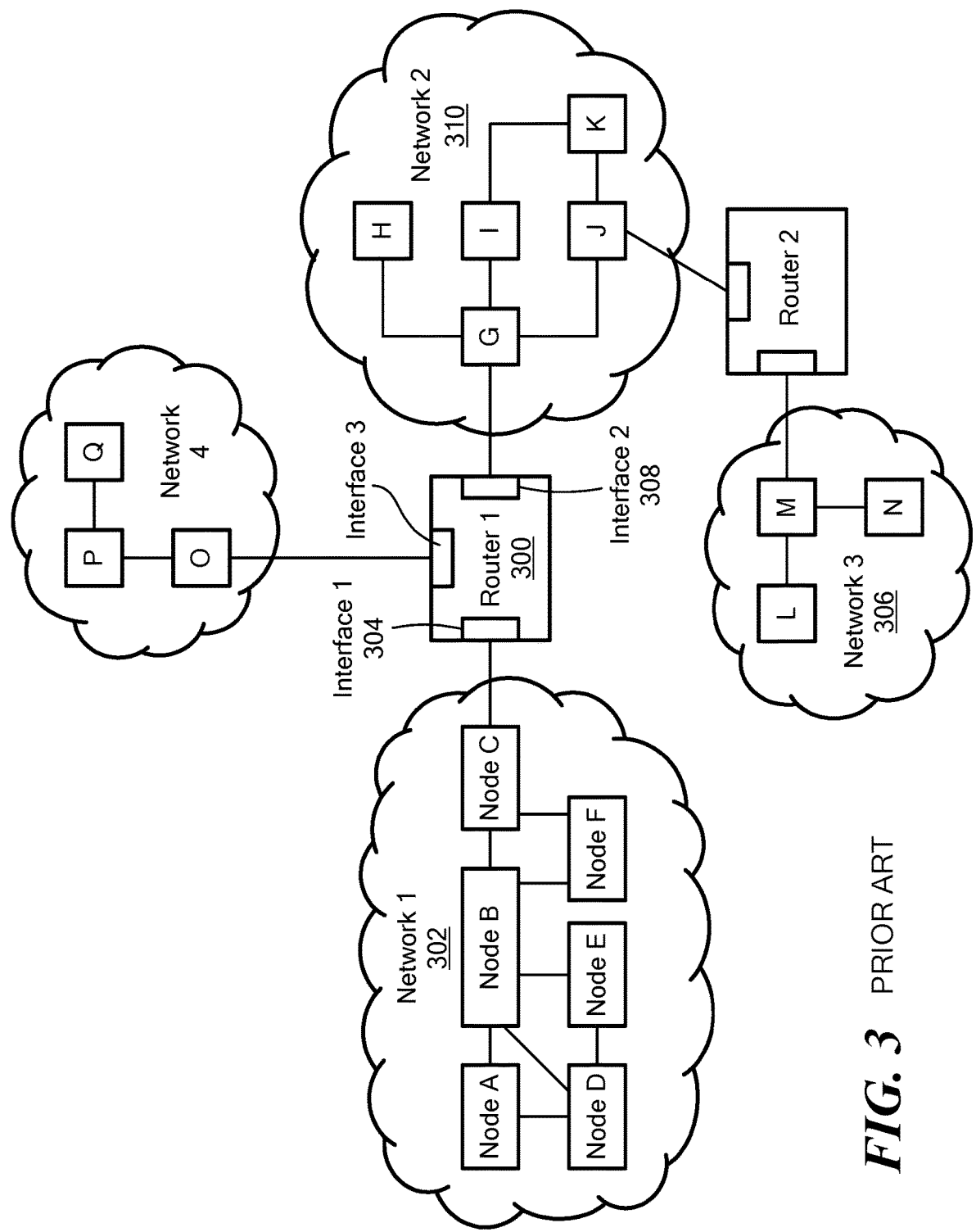
FIG. 3 schematically shows a hypothetical internet that may implement certain illustrative embodiments of the invention.

As depicted schematically in FIG. 3, a router typically acts as a node that interconnects two or more distinct networks or two or more sub-networks (subnets) of a single network, thereby creating a "network of networks" (i.e., an internet). Thus, a router has at least two interfaces; e.g., where each interface connects the router to a different network, as exemplified by Router 1 300 in FIG. 3. Each router also includes a packet router (not shown in FIG. 3 for convenience) that is configured to route packets between the various interfaces based on routing information stored in a routing table. As part of routing packets or otherwise, the packet router is configured to process packets received by the router and to generate packets for transmission by the router.

When a router receives a packet via one interface from one network, it uses information stored in its routing table (sometimes referred to as a "Forwarding Information Base" or "FIB") to direct the packet to another network via another interface, e.g., based on the destination address in the packet, or based on a combination of information in the packet. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each IP packet as an independent transaction that is unrelated to any previous IP packet. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Certain illustrative embodiments, however, may include routers that statefully communicate, as discussed herein.

As noted, when a router receives a packet via one interface from one network, the router uses its routing table to direct the packet to another network. The following is some of the types of information typically found in a basic IP routing table:
  Destination: Partial IP address (Expressed as a bit-mask) or Complete IP address of a packet's final destination;
  Next hop: IP address to which the packet should be forwarded on its way to the final destination;
  Interface: Outgoing network interface to use to forward the packet;
  Cost/Metric: Cost of this path, relative to costs of other possible paths;
  Routes: Information about subnets, including how to reach subnets that are not directly attached to the router, via one or more hops; default routes to use for certain types of traffic or when information is lacking.

Routing tables may be filled in manually, such as by a system administrator, or dynamically by the router. Routers generally run routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

Additionally, routers also may utilize the Bidirectional Forwarding Detection (BFD) protocol to monitor communication links to adjacent routers. The BFD protocol is described in IETF RFC 5880, which is hereby incorporated herein by reference in its entirety. In many cases, the BFD protocol can detect the failure of a communication link before the routing protocol detects the failure, so, in some situations, the BFD protocol can provide advanced warning to the router that a routing change is needed or is forthcoming.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client computer executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. In some cases, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Router Architecture

Figure 4:
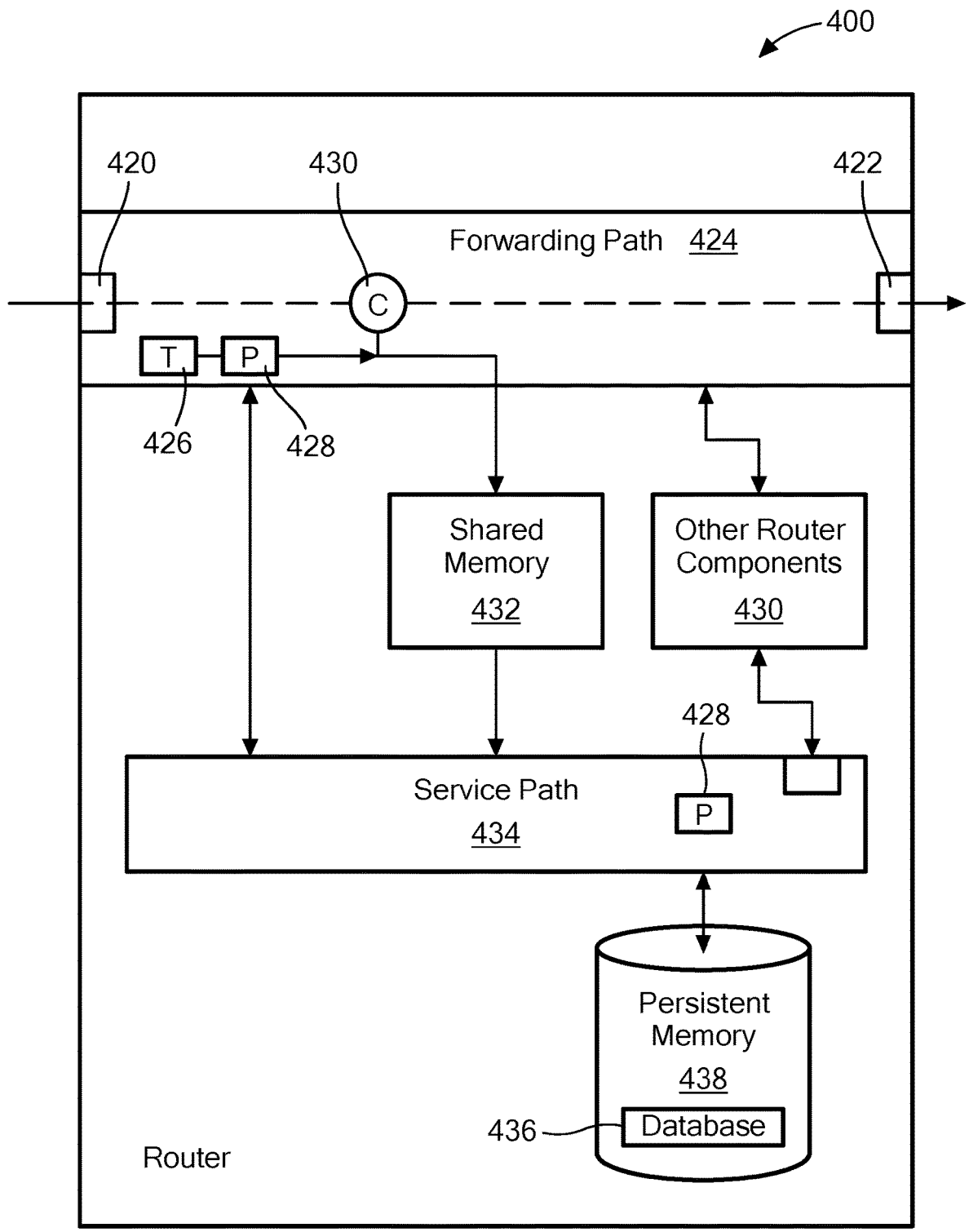
FIG. 4 schematically shows relevant portions of a router including a forwarding path and a service path, in accordance with one exemplary embodiment.

In certain exemplary embodiments (but not necessarily all embodiments), one or more routers may be configured, architecturally, such that the packet router includes two processing pathways or planes, namely a "forwarding path" and a "service path." FIG. 4 schematically shows relevant portions of a router that may be used to implement certain illustrative embodiments of the invention. It should be noted that the router 400 shown in FIG. 4 is a significantly simplified representation of a router used for illustrative purposes. The present invention is not limited to the router architecture shown in FIG. 4 or to any particular router architecture.

Among other things, the router 400 includes a number of interfaces (two are shown in FIG. 4 for convenience, specifically reference number "420" and reference number "422") for receiving packets from other network devices or nodes and/or for forwarding packets to other network devices or nodes. These interfaces are similar to those shown in FIG. 3 and identified as Interfaces 1, 2 and 3. As such, each interface can act as an input or output. For discussion purposes only, however, interface 420 of the router 400 of FIG. 4 is considered an input for receiving packets, while interface 422 is considered an output to forward packets to other network devices. Indeed, those skilled in the art understand that such interfaces can have both input and output functionality.

The router 400 also has a forwarding path 424 that forwards packets through the router 400 from the input interface 420 to the output interface 422. Specifically, as known by those skilled in the art, the forwarding path 424 (also known as a "fast path," "forwarding plane," "critical path," or "data plane") contains the logic for determining how to handle and forward inbound packets received at the input interface 420. Among other things, the forwarding path 424 may include the prior noted routing table (identified in FIG. 4 by reference number "426") and one or more processors/cores (all processors in FIG. 4 are identified by reference number "428") for directing the package through the forwarding fabric of the router 400 to the appropriate output interface 422. To those ends, the forwarding path 424 includes, among other things, logic for (1) decoding the packet header, (2) looking up the destination address of the packet header, (3) analyzing other fields in the packet, and (4) processing data link encapsulation at the output interface 422.

As known by those in the art, the forwarding path 424 may be considered to have a dynamically varying line rate of forwarding packets from the input interface 420 to the output interface 422. Indeed, this line rate is a function of the processing power of the processors 428 within the forwarding path 424, its routing algorithms, and the volume of packets it is forwarding. As noted below, some embodiments may configure the forwarding path 424 to have a minimum line rate that the forwarding path 424 should maintain.

The router 400 also has a service path 434 that is separate from the forwarding path 424. The service path 434 has logic/processing devices 428 configured to perform various processing functions. Among other things, the service path 434 typically runs one or more routing protocols and optionally also the BFD protocol in order to obtain routing and link status information, which it may store in a database 436 within a persistent memory 438 (e.g., a flash drive or hard drive) that can be internal to the router 400 as shown in FIG. 4 or optionally can be external to the router 400. The service path 434 typically also processes packets that cannot be processed completely by the forwarding path, such as, for example, packets that are specifically destined for router 400 or special processing involved with "stateful" routing (e.g., special processing of a first session packet containing special metadata) as discussed below. For example, the forwarding path 424 may redirect certain packets it receives to the service path 434 for special processing. Depending on the type of packet received, the service path 434 may terminate the received packet (e.g., without generating any packet to be transmitted), may create a return packet for the forwarding path 424 to forward back to the source of the received packet (e.g., over the input interface 420), or may create a forward packet for the forwarding path 424 to forward to another device (e.g., over the output interface 422).

The router 400 may have a shared memory 432 (e.g., RAM) and/or other shared router components 440 that permit the forwarding path 424 and the service path 434 to share information and in some embodiments also to communicate directly or indirectly with one another. For example, as discussed above, the forwarding path 424 may redirect packets to the service path 434 for processing, and the service path may generate packets to be forwarded by the forwarding path 424. Also, the forwarding path 424 may have one or more counters 430 that gather statistical information about packets traversing through the forwarding path 424, and these counters 430 may be stored in the shared memory 432 to allow the service path 434 to access the counters 430 for processing and optional storage in a database 436 within a persistent memory 438 (e.g., a flash drive or hard drive) that can be internal to the router 400 as shown in FIG. 4 or optionally can be external to the router 400. One advantage of this architecture is that time-intensive tasks can be offloaded from the forwarding path 424 and instead performed by the service path 434.

Typically, the service path 434 is responsible for managing the routing table 426 (e.g., via a shared memory 432 or via direct or indirect communication) to set up routing information (sometimes referred to herein as "flows") to be used by the forwarding path 424. The routing table 426 may be stored in the shared memory 432 so that it can be accessed as needed by both the forwarding path 424 and the service path 434. Based on information obtained from a routing protocol and/or other protocols, the service path 424 may determine routes and update the routing table 426 with such routes.

Figure 5:
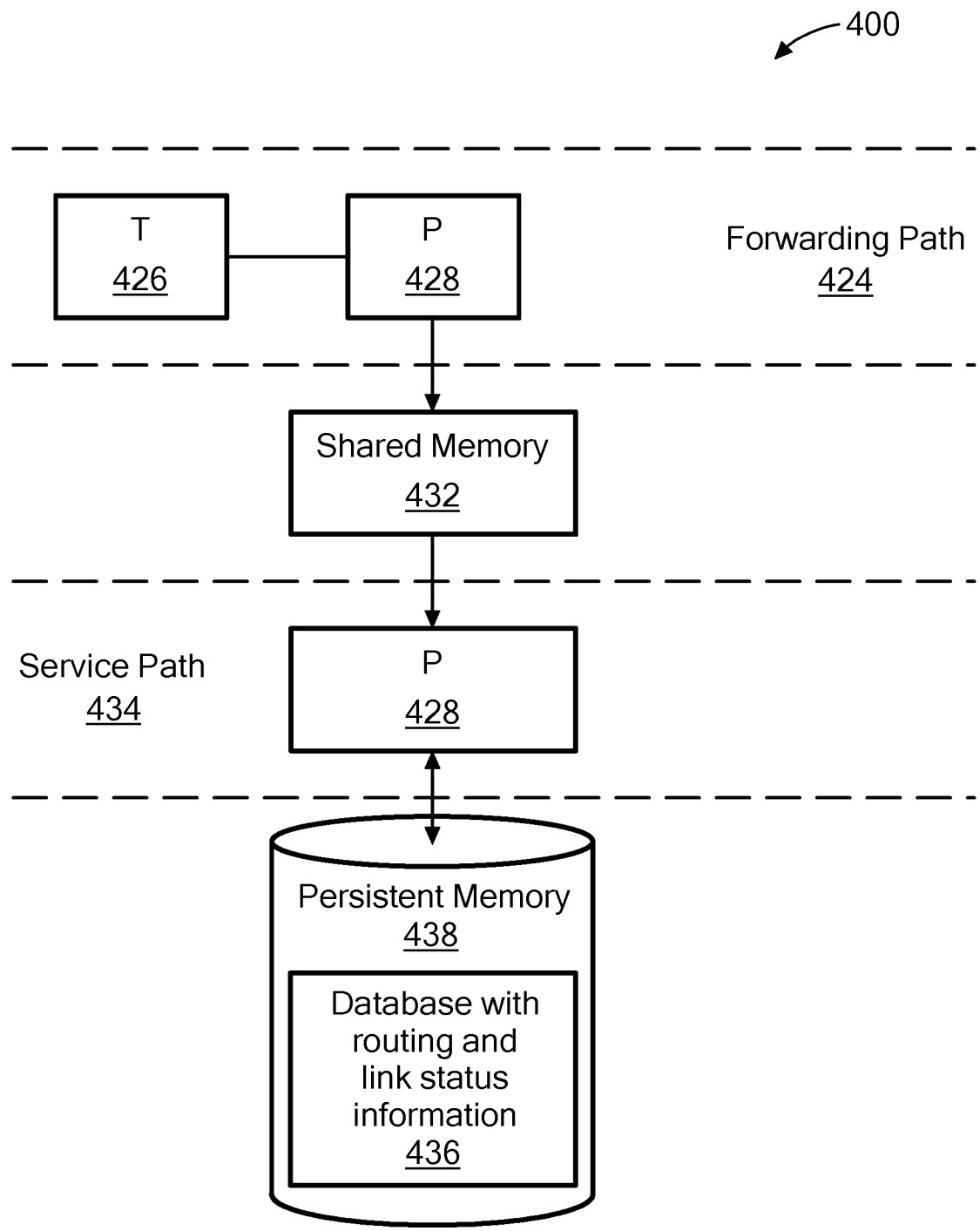
FIG. 5 schematically shows additional details of shared management of a routing table by the forwarding path and the service path of FIG. 4, in accordance with certain illustrative embodiments.

FIG. 5 schematically shows additional details of shared management of the routing table by the forwarding path 424 and the service path 434, in accordance with certain illustrative embodiments.

Routing Flows

Certain exemplary embodiments are described herein with reference to a construct referred to as a "flow." Generally speaking, a flow is a descriptor used internally by the router (e.g., by the forwarding path 424 of certain routers) to process and forward a particular set of packets (e.g., packets having a certain destination address or range of destination addresses, or packets associated with a particular "session" as discussed below with reference to "stateful" routing). In certain exemplary embodiments, a flow is associated with an ingress port on which such packets are expected to be received and an egress port over which such packets are to be forwarded. A flow typically also defines the type(s) of processing to be performed on such packets (e.g., decompress packets, decrypt packets, enqueue packets for forwarding, etc.). When a packet arrives at an interface of a router, the router attempts to find a flow that is associated with the packet (e.g., based on the destination address of the packet, or based on a session with which the packet is associated as discussed below). Generally speaking, if the router locates an active flow for the packet, then the router processes the packet based on the flow, but if the router cannot locate an active flow for the packet, then the router processes the packet (e.g., by the service path 434 of certain routers).

In certain exemplary embodiments, each flow is associated with an "action chain" established for the flow. Each action chain includes a series of functional blocks, with each functional block having a specific function associated with routing packets associated with the session/flow (e.g., decompress packets, decrypt packets, enqueue packets for forwarding, etc.). The action chains associated with different sessions/flows can have different functional blocks depending on the type of processing needed for the session/flow. In routers of the type shown and described with reference to FIG. 4, action chains may be stored in the shared memory 432, thereby allowing the forwarding path 424 to use the action chains and the service path 434 to manipulate the action chains as discussed below.

In certain exemplary embodiments, each action chain has a leading "chain descriptor" that includes two fields:
1. A pointer field containing a pointer to the first functional block in the action chain, and
2. A "valid" field (e.g., one or more bits) that is used to indicate whether the action chain is valid or invalid. Typically, one particular value of the valid field is used to indicate that the action chain is valid and can be used, while another value of the valid field is used to indicate that the action chain is invalid/deactivated.

Figure 6:
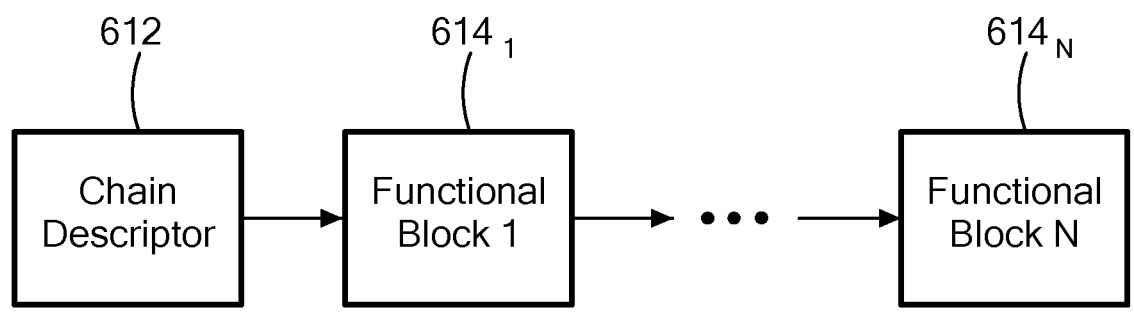
FIG. 6 is a schematic diagram of an action chain used to process and forward packets, in accordance with one exemplary embodiment.

FIG. 6 is a schematic diagram of an action chain, in accordance with one exemplary embodiment. As discussed above, the action chain includes a chain descriptor 612 and a number of functional blocks 6141-614N. A packet is processed by first locating the action chain associated with the packet and then executing each functional block in order to effectuate processing/forwarding of the packet.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" or "backward" or "return" packets or the "reverse" or "backward" or "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible.

The AIPRs through which the lead packet passes insert special metadata into the lead packet and optionally also into return packets as needed to allow each AIPR on the path to determine whether there is a prior AIPR on the path and whether there is a next hop AIPR on the path. In order to force session packets to traverse the same set of AIPRs, each successive AIPR typically changes the destination address field in each session packet to be the address of the next hop AIPR and changes the source address field in each session packet to be its own network address. The last AIPR prior to the destination node then typically will change the source and destination address fields back to the original source and destination addresses used by the source node. In this way, session packets can be forwarded, hop by hop, from the source node through the set of AIPRs to the destination node, and vice versa.

Figure 7:
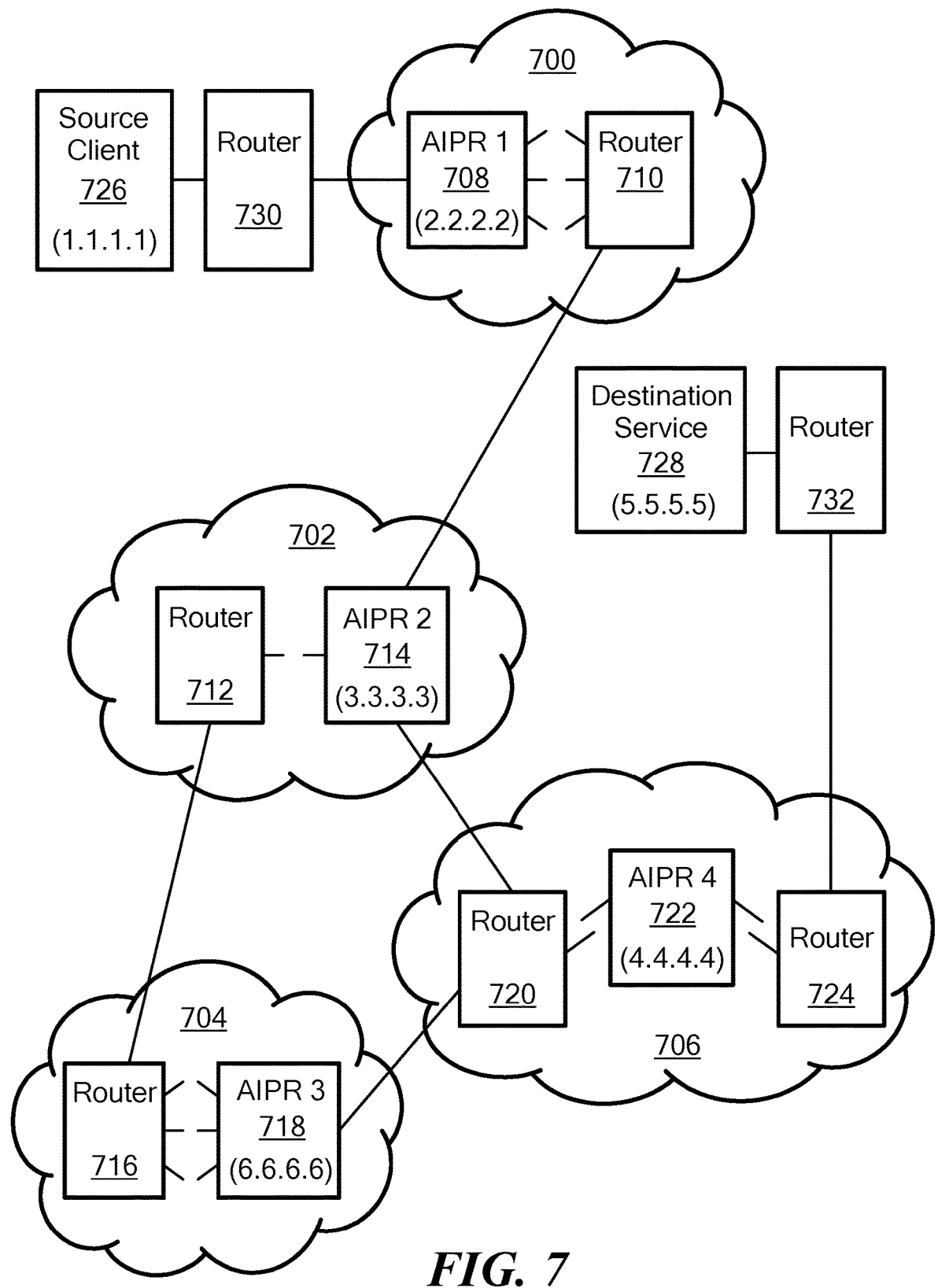
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
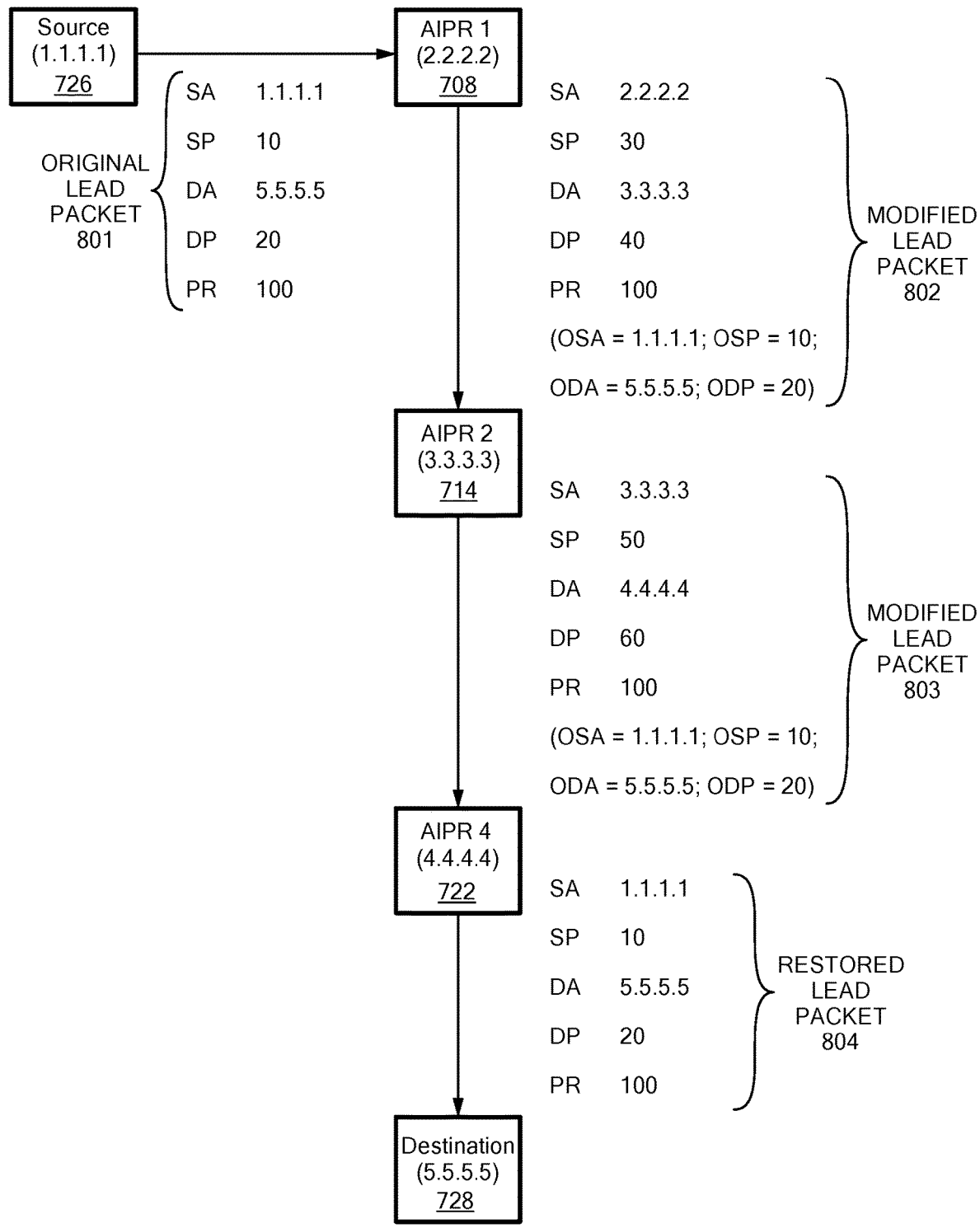
FIG. 8 schematically shows an example of lead packet processing from a source node to a destination node for stateful routing, in accordance with one exemplary embodiment.
Figure 12:
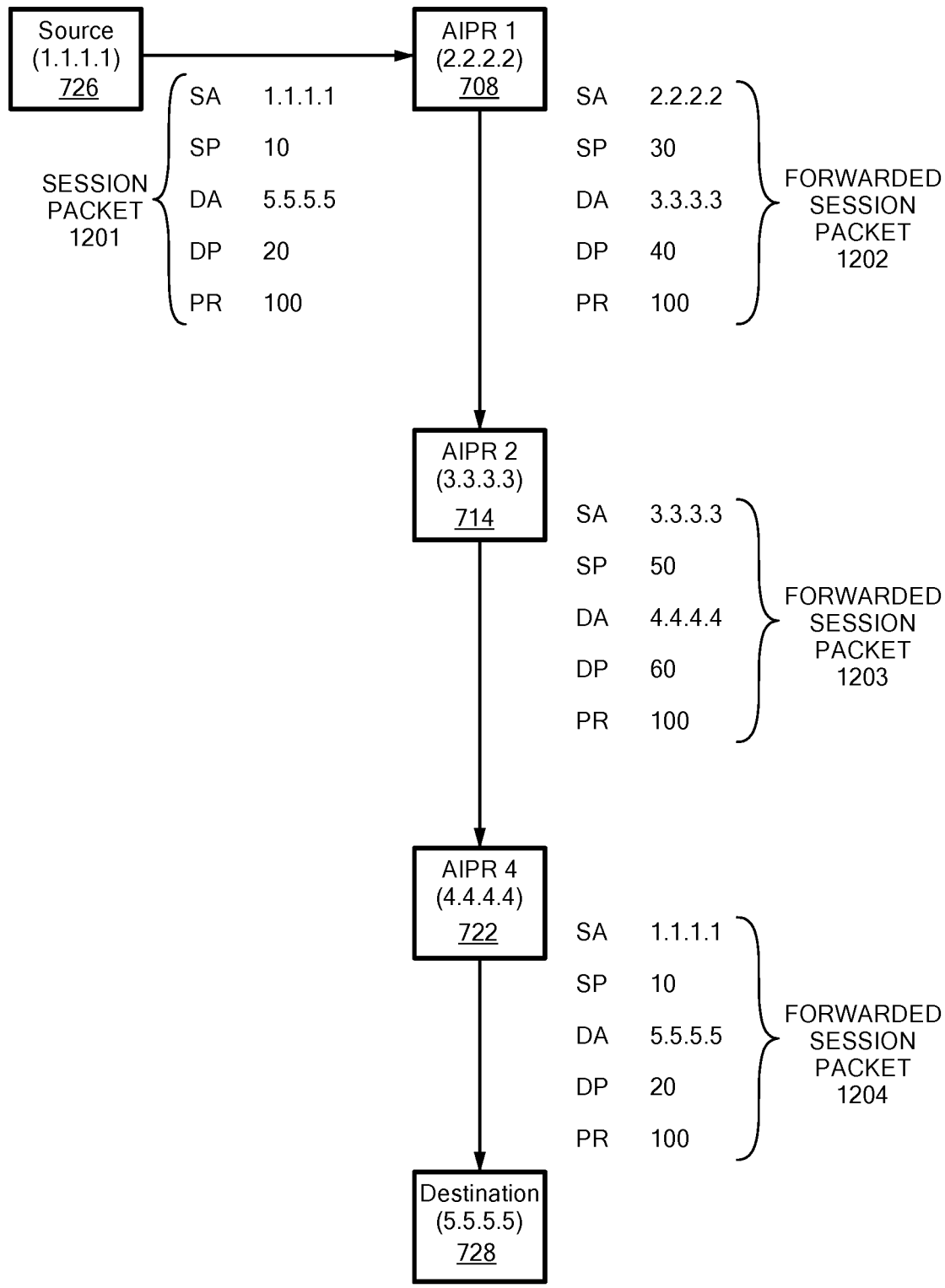
FIG. 12 is a schematic diagram providing an example of session packet processing for an example packet sent from the source device to the destination device through the AIPR devices for the session established in FIG. 8, in accordance with one exemplary embodiment.
Figure 13:
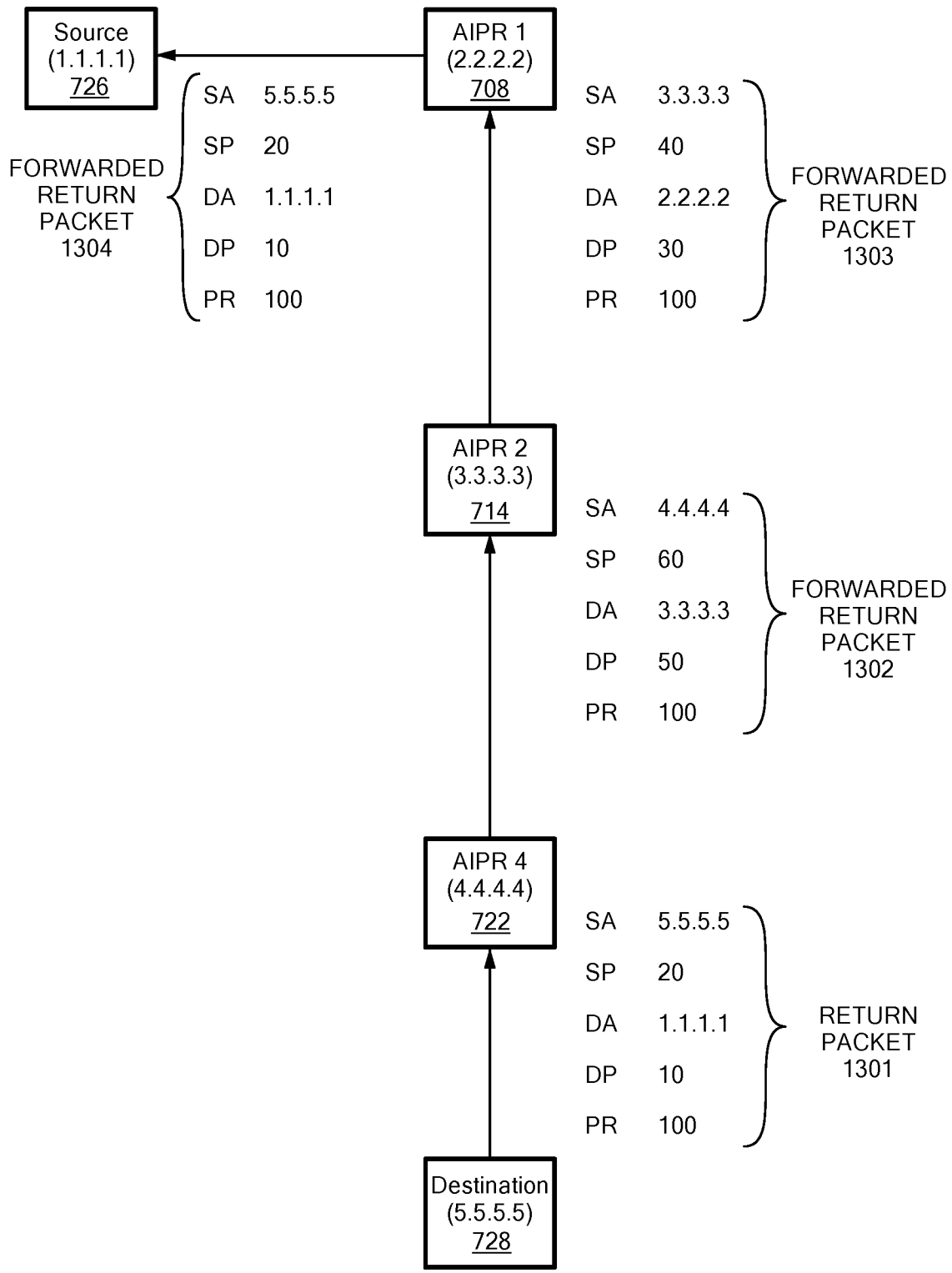
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with certain illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing interface for a particular destination network address, but also the next waypoint AIPR (if any) to use for that destination network address. In this example, the nodes communicate using TCP/IP-based messages, and the metadata inserted into the lead packet may be conveyed, for example, as a TCP Option field or added to the TCP packet as payload data. In various alternative embodiments, the nodes may communicate using other protocols, and the method in which the metadata is conveyed in the lead packet would be protocol-specific.

As noted above, in stateful routing, all forward packets associated with a particular session are made to follow the same path through a given set of AIPRs on their way from the source client node 726 to the destination service node 728. In a similar manner, all return packets associated with the session typically, but not necessarily, are made to traverse the same set of AIPRs in reverse order on their way from the destination service node 728 to the source client node 726 (which may be referred herein to as "bi-flow").

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example, for a TCP/IP-based session, AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path. AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11.

Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, randomly).

Figure 14:
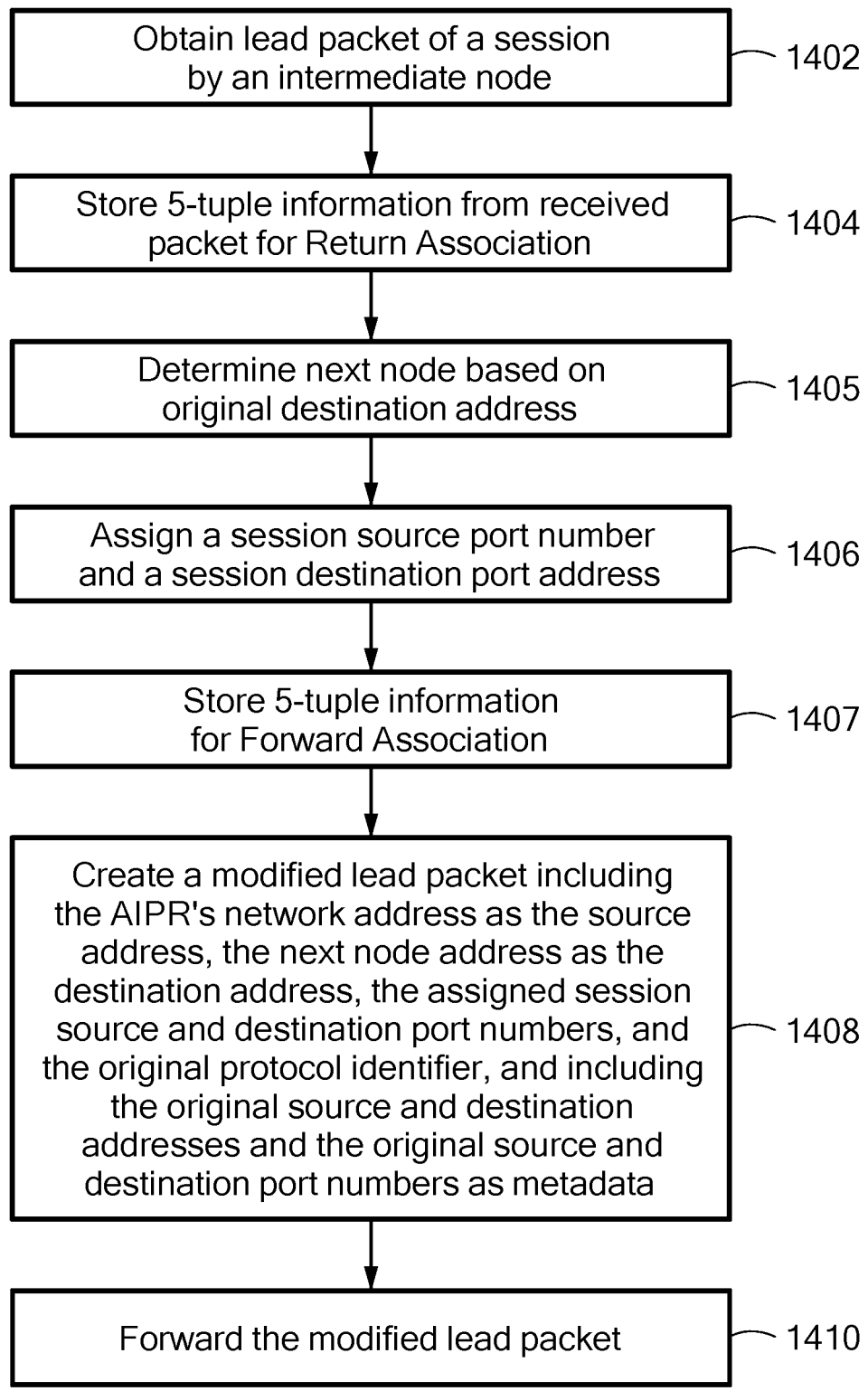
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next waypoint AIPR based on the original destination address. This typically involves accessing the AIPR's routing information base from which the AIPR can determine the outgoing port and next waypoint AIPR (if any) for the original destination address.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
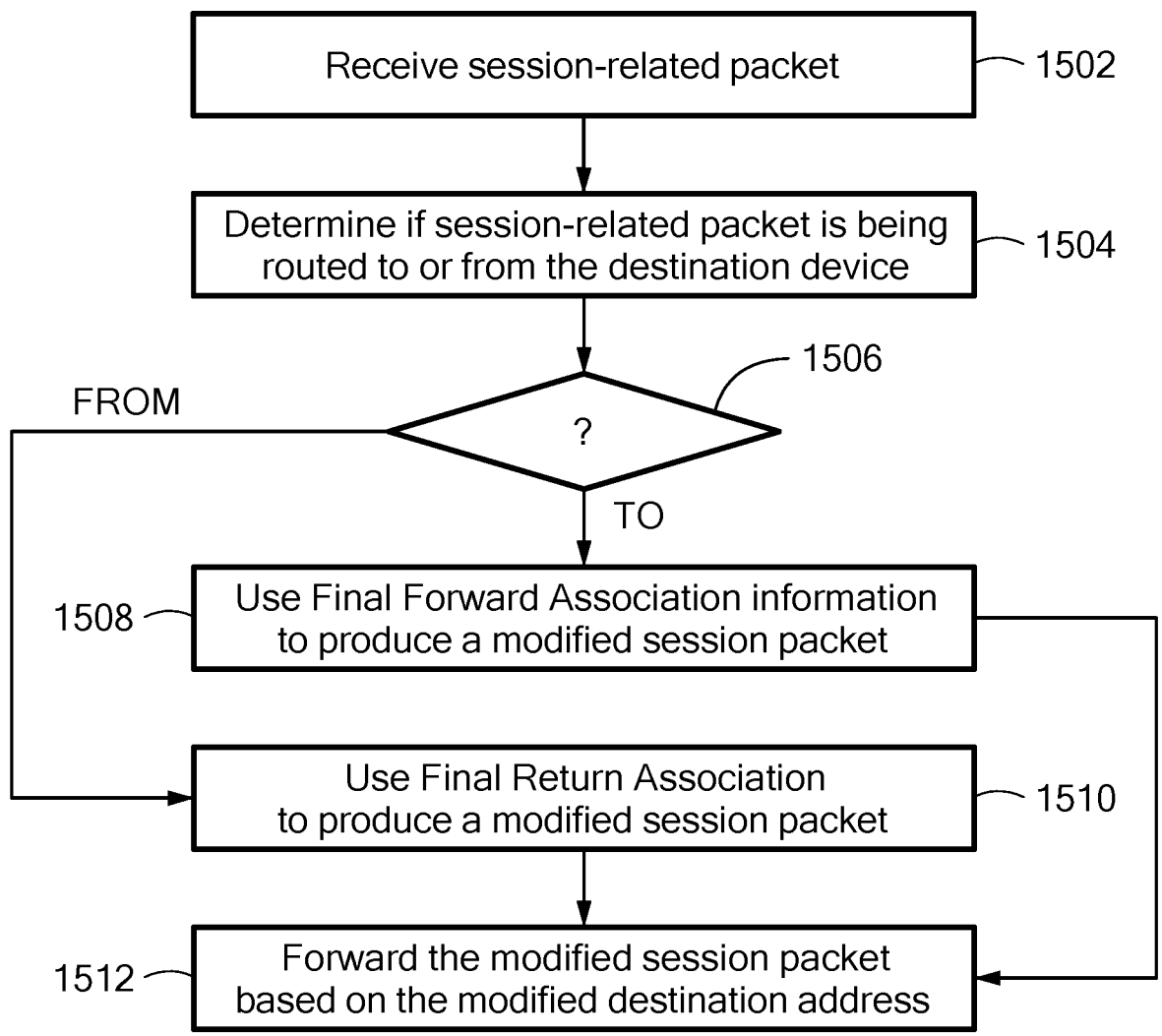
FIG. 15 is a flowchart schematically illustrating some session packet processing operations performed by an AIPR, in accordance with one exemplary embodiment.

FIG. 15 is a flowchart 1500 schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | | |
|---|---|---|
| SA | 2.2.2.2 | |
| SP | 10 | |
| DA | 5.5.5.5 | |
| DP | 20 | |
| PR | 100 | |
| SSP | 30 | (session source port number assigned by AIPR 1 708) |
| SDP | 40 | (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | | |
|---|---|---|
| SA | 3.3.3.3 | |
| SP | 10 | |
| DA | 5.5.5.5 | |
| DP | 20 | |
| PR | 100 | |
| SSP | 50 | (session source port number assigned by AIPR 2 714) |
| SDP | 60 | (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | | |
|---|---|---|
| SA | 4.4.4.4 | |
| SP | 10 | |
| DA | 5.5.5.5 | |
| DP | 20 | |
| PR | 100 | |
| SSP | 70 | (session source port number assigned by AIPR 4 722) |
| SDP | 80 | (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 in order to establish an end-to-end communication session between the source client node 726 and the destination service node 728.

Lead Packet Identification

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
| --- | --- | --- |
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |

| Protocol | Destination Port | Technique for Start/End Determination |
| --- | --- | --- |
| UDP-NTP | 123 | Each DNS query/response is a full session. So, each query is a start, and each response is an end. |

Figure 16:
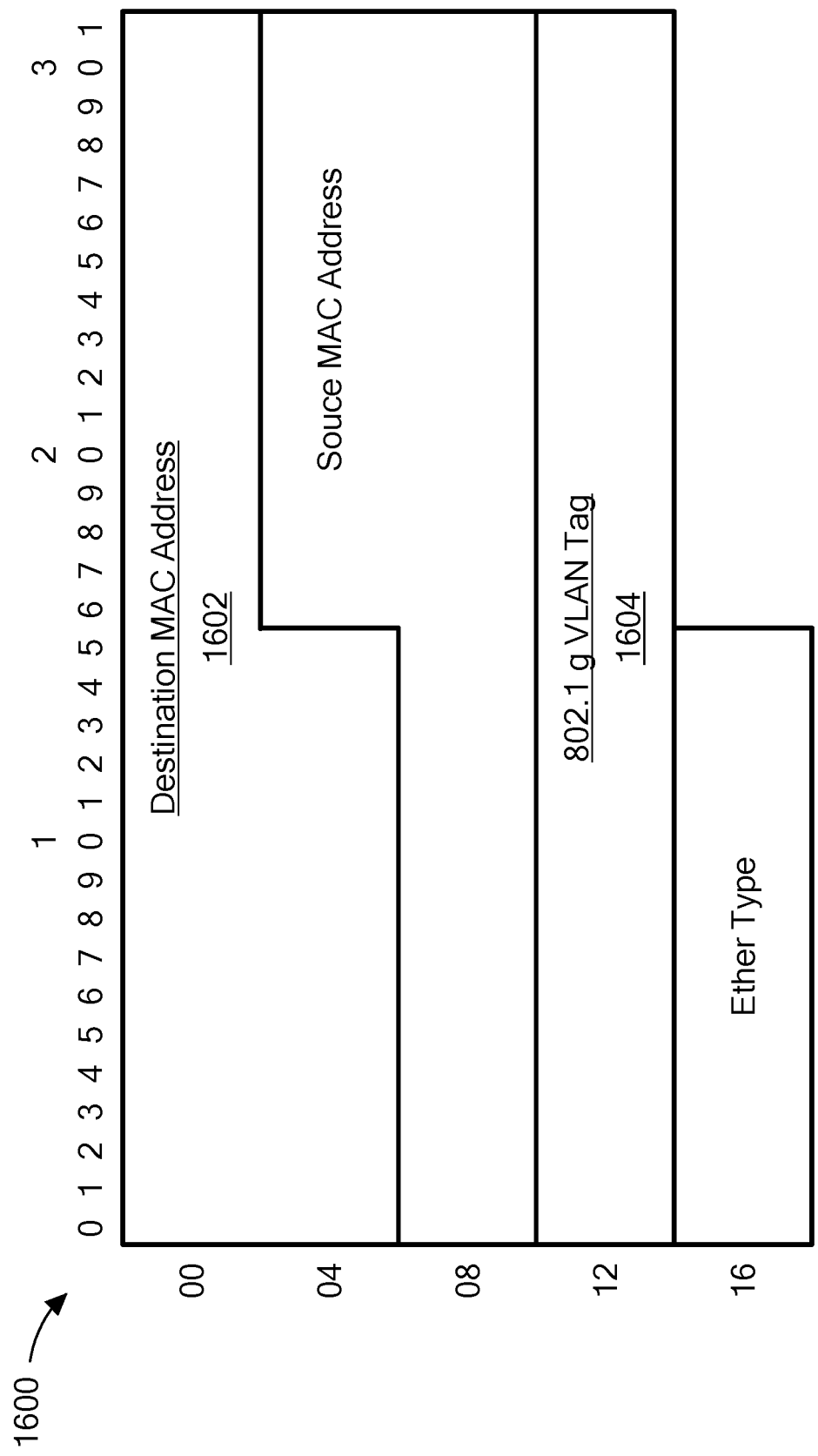
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
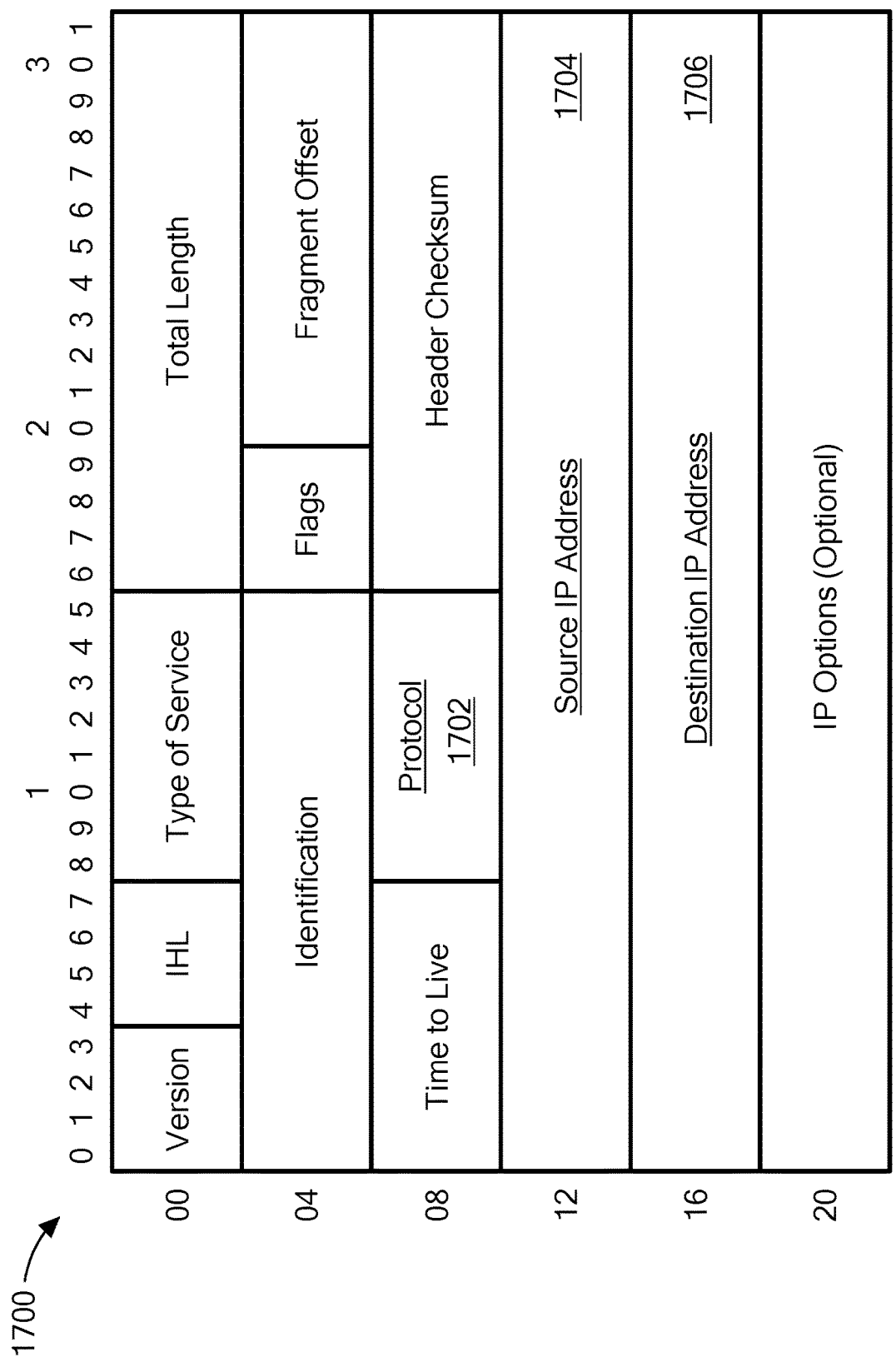
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
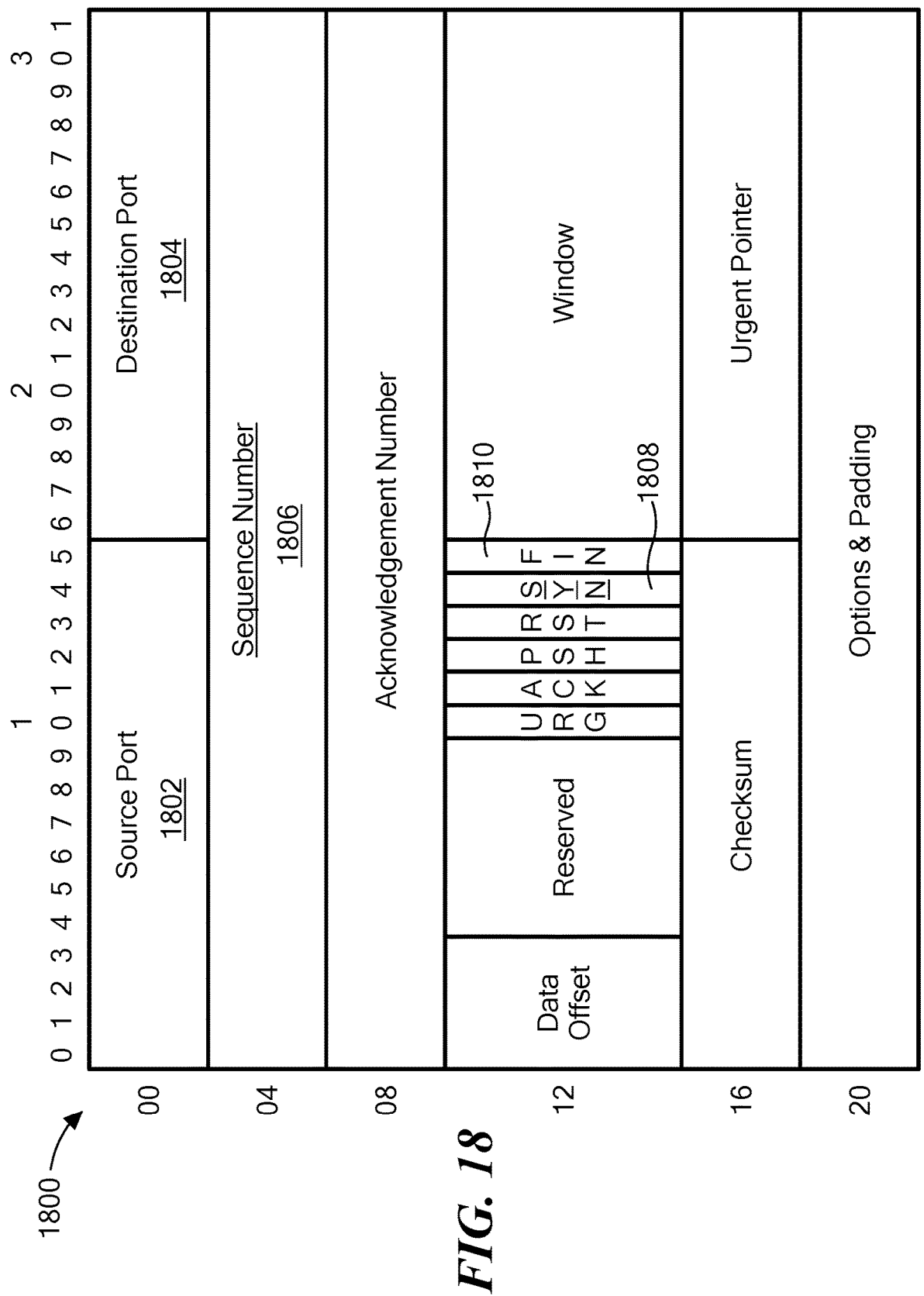
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
| --- | --- | --- |
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
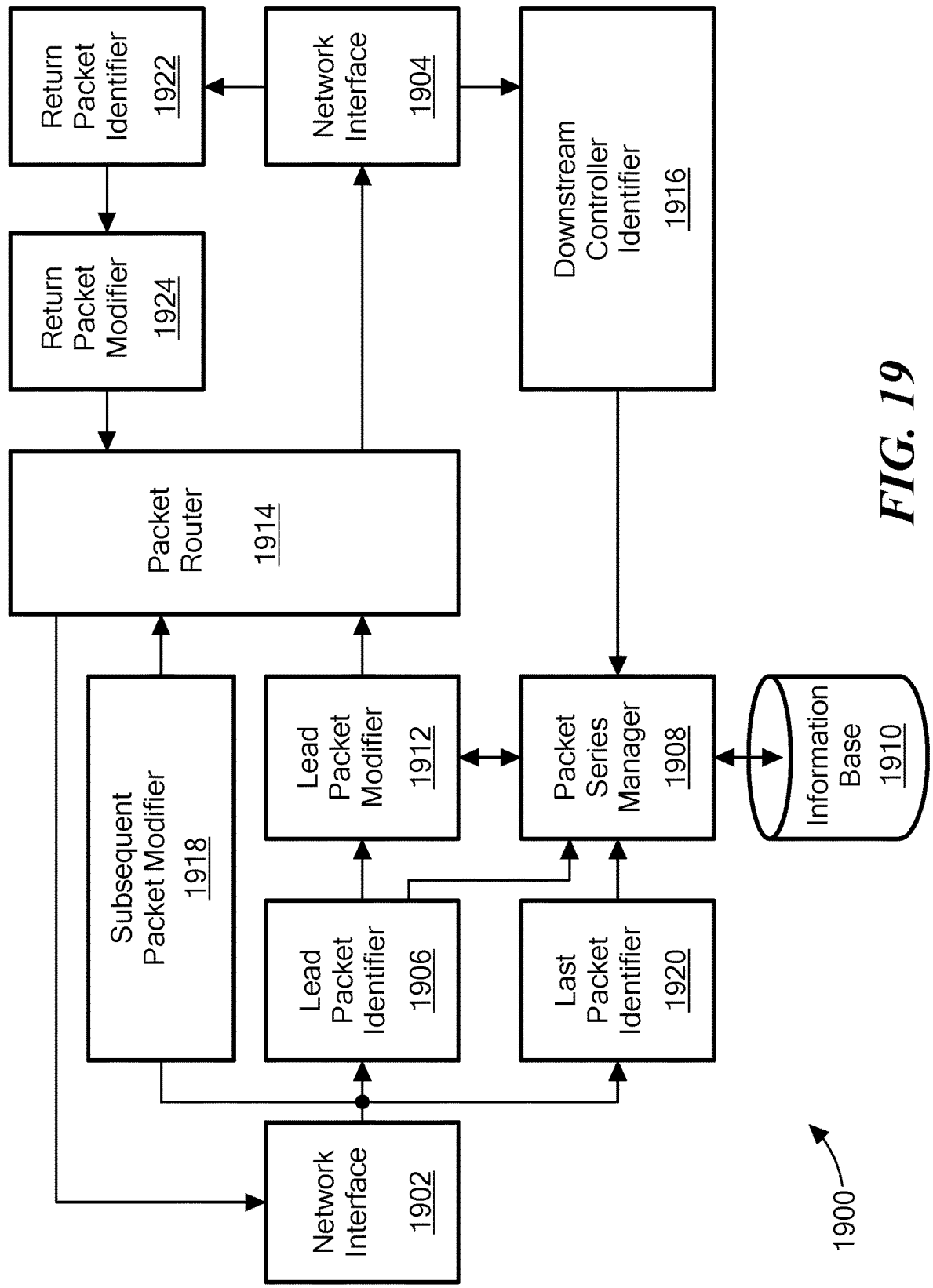
FIG. 19 schematically shows a block diagram of an AIPR of FIG. 7, in accordance with one exemplary embodiment.

FIG. 19 is a schematic block diagram of an AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
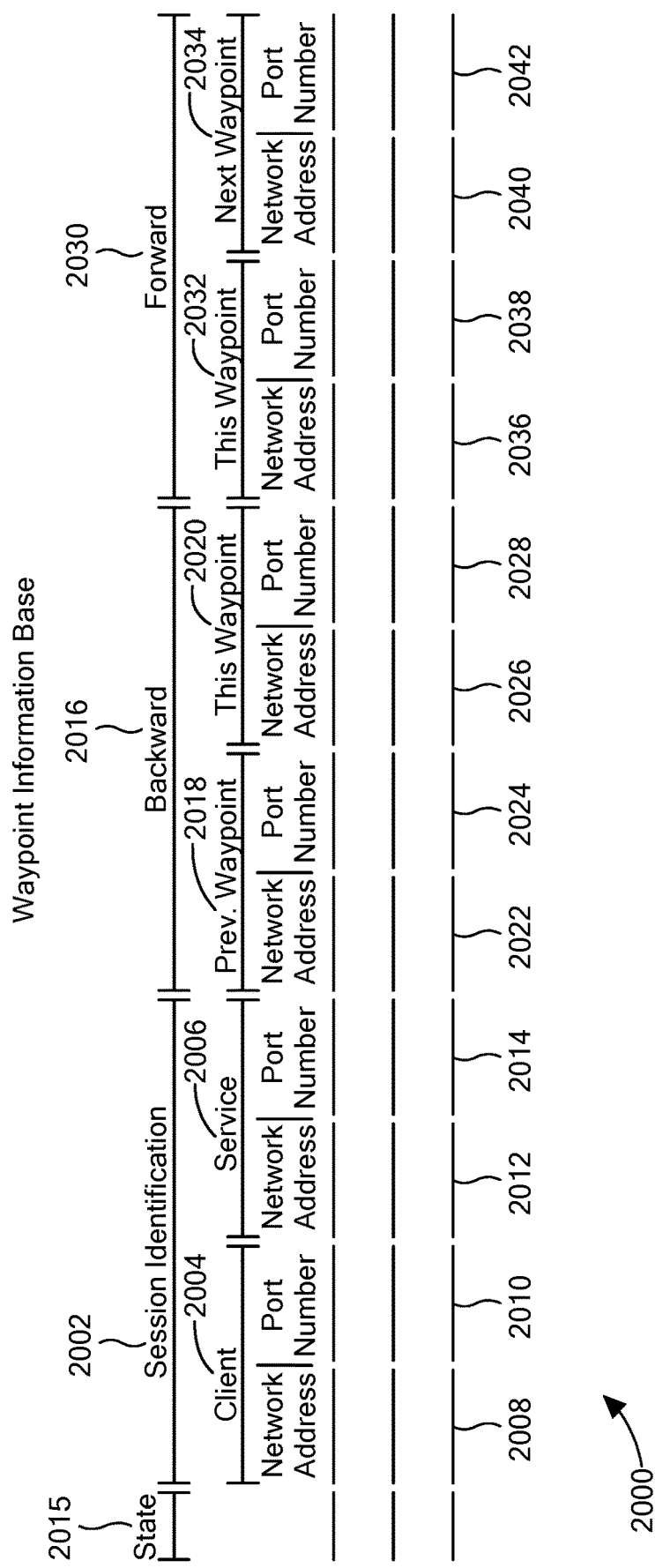
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
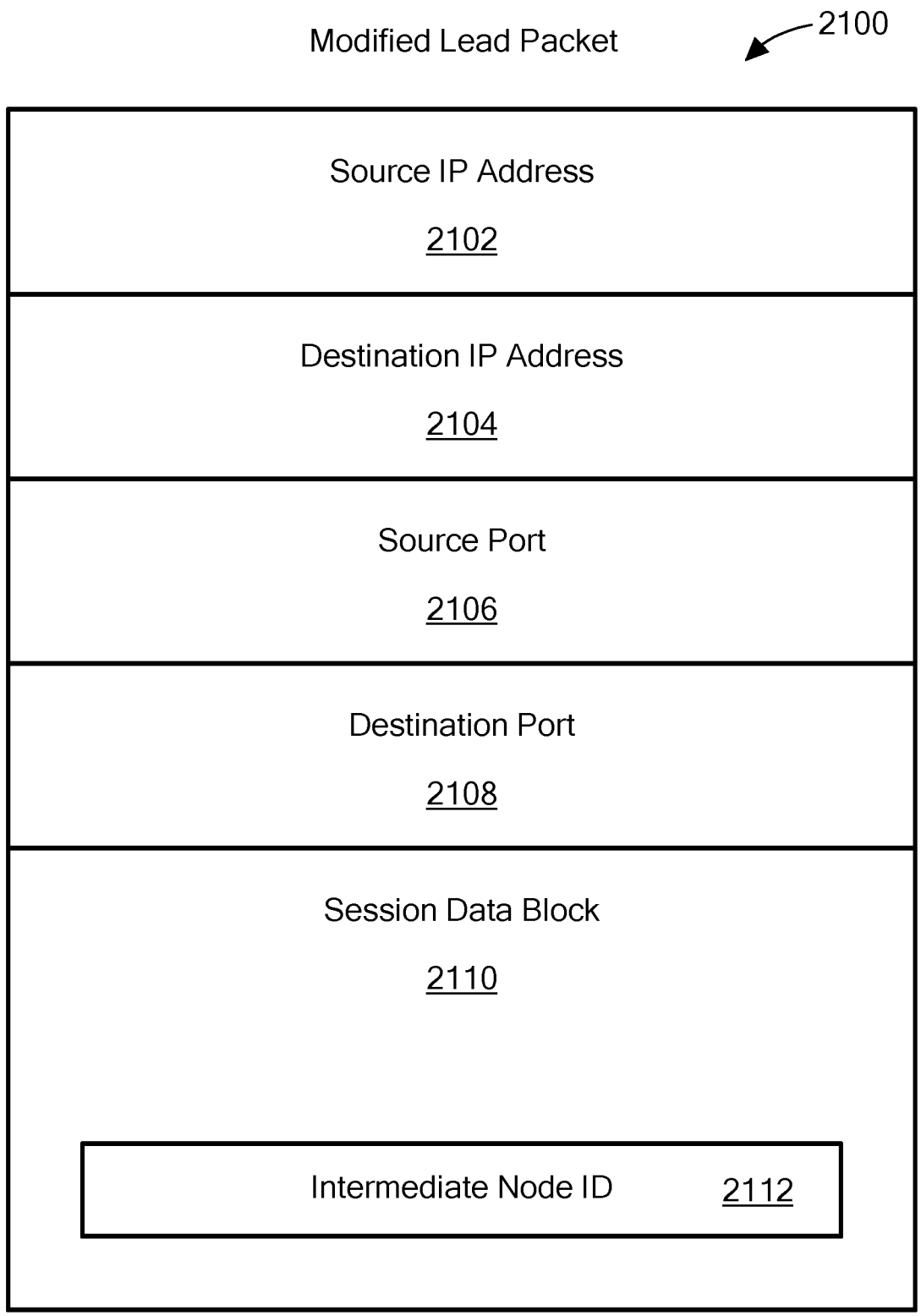
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000.

The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
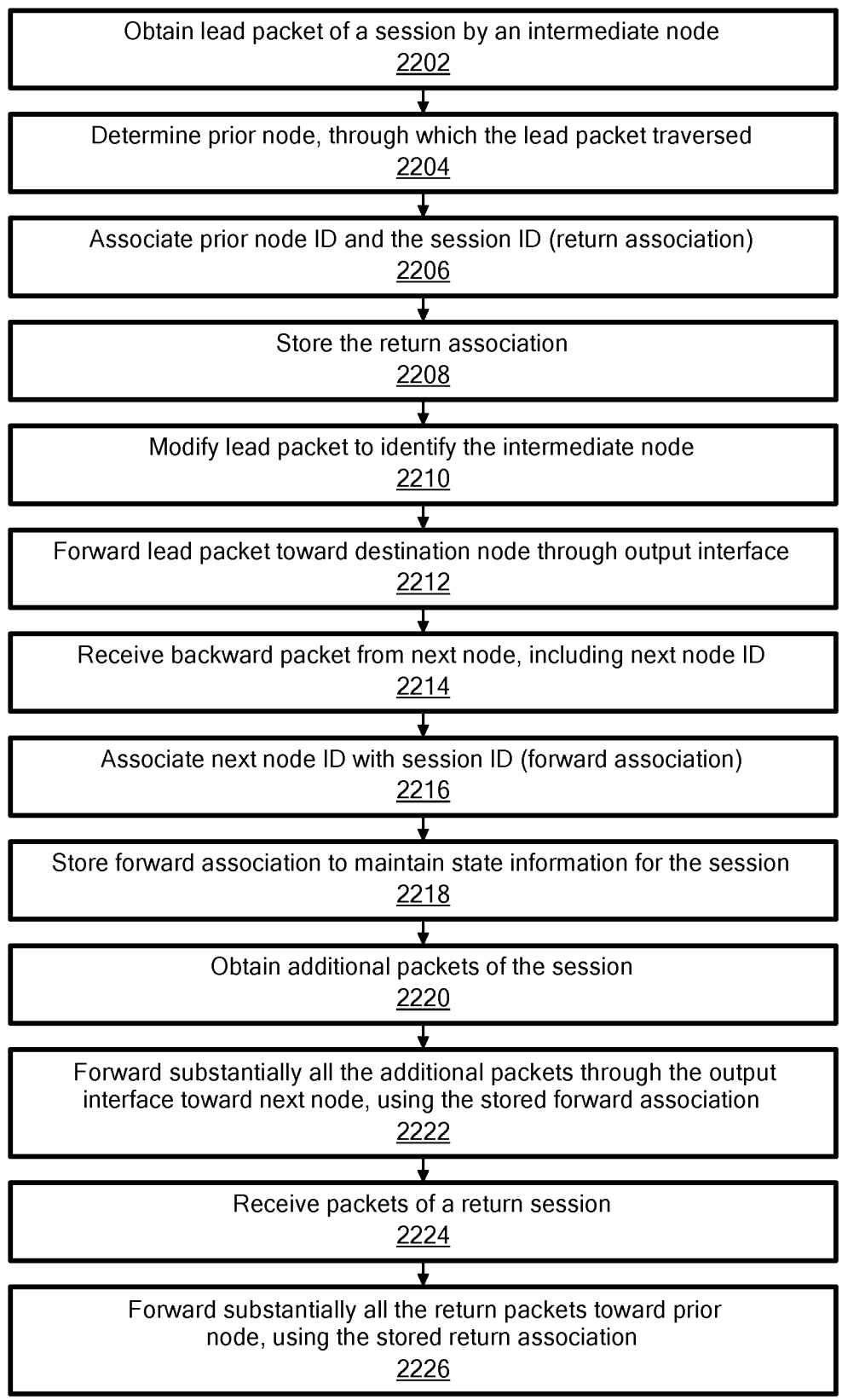
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
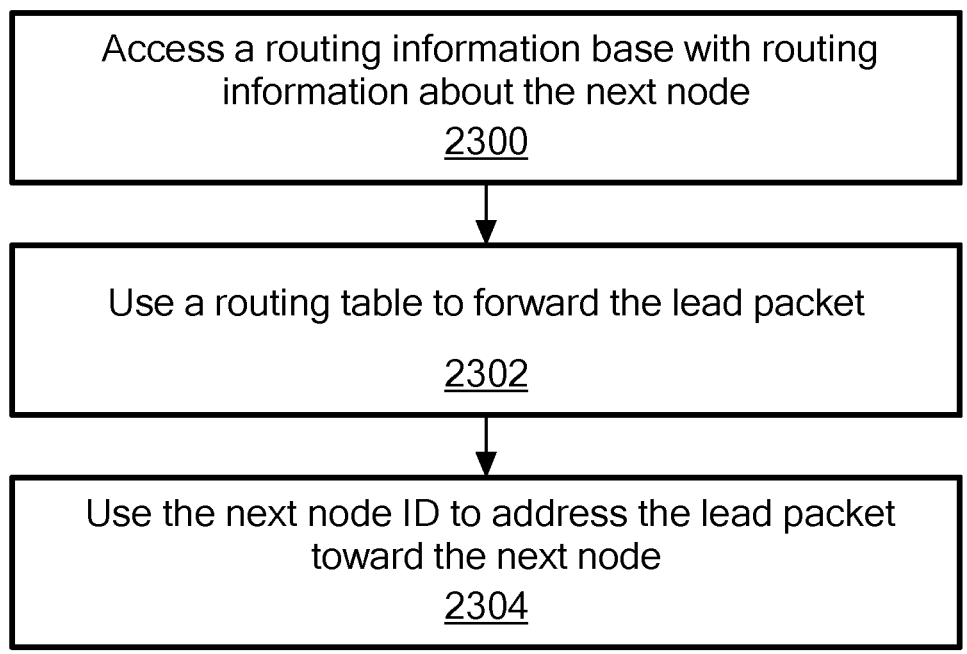
FIG. 23 is a flowchart illustrating some of the operations involved with forwarding a lead packet as part of the process of FIG. 22, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Reverse Forwarding Information Base Enforcement

As discussed above, when a first packet for a new session arrives at an AIPR on a given ingress interface, the AIPR establishes a stateful routing session for routing forward and return session packets s. The AIPR typically establishes the session such that return session packets will be forwarded back over the ingress interface used for forward session packets such that both forward session packets and return session packets associated with the session traverse the same set of AIPRs (which may be referred to herein as "bi-flow"). Some embodiments may require that all sessions be established as bi-flow sessions, while other embodiments may allow a user or administrator to configure whether sessions must be established as bi-flow sessions or alternatively whether sessions are permitted to use a different interface for return session packets. Some embodiments may allow such configuration to be made on a session-by-session basis, such that some sessions may be configured to require bi-flow while other sessions may be configured to not require bi-flow. For example, some BGP sessions may be asymmetric, in which case bi-flow may be disabled for such sessions. In sessions that do not require bi-flow, the AIPR may choose the best interface to use for return session packets, which in some cases may be the ingress interface and in other cases may be a different interface.

Therefore, in certain exemplary embodiments, when a first packet for a new session arrives at an AIPR on a given ingress interface, the AIPR determines whether the ingress interface is suitable for use in forwarding return session packets. In certain exemplary embodiments, determining whether the ingress interface is suitable for the return path includes first determining if the routing information base includes a valid route for the return path and, if so, determining whether the next hop on the return path is associated with the ingress interface. If there is a valid route for the return path and the next hop for the route is associated with the ingress interface, then the ingress interface is deemed to be suitable for the return path, otherwise the ingress interface is deemed to be not suitable for the return path. Additionally or alternatively, if a certain level of performance is required (e.g., bandwidth, error rate, latency, etc.), then the AIPR may determine whether the ingress interface can provide that level of performance for return packets. If the ingress interface is suitable for the return path, then the AIPR may continue to establish the session using the ingress port for the return path. If the ingress interface is not suitable for the return path, then the AIPR may drop the session (e.g., by either sending back a session rejection message or sending back no reply message) if the session is required to a bi-flow session or may try to use another interface for the return path if the session is not required to be a bi-flow session. For example, the AIPR may determine if one or more other interfaces are suitable for the return path and either continue to establish the session using an alternate interface that is suitable for the return path or drop the session if no interface is suitable for the return path.

Figure 24:
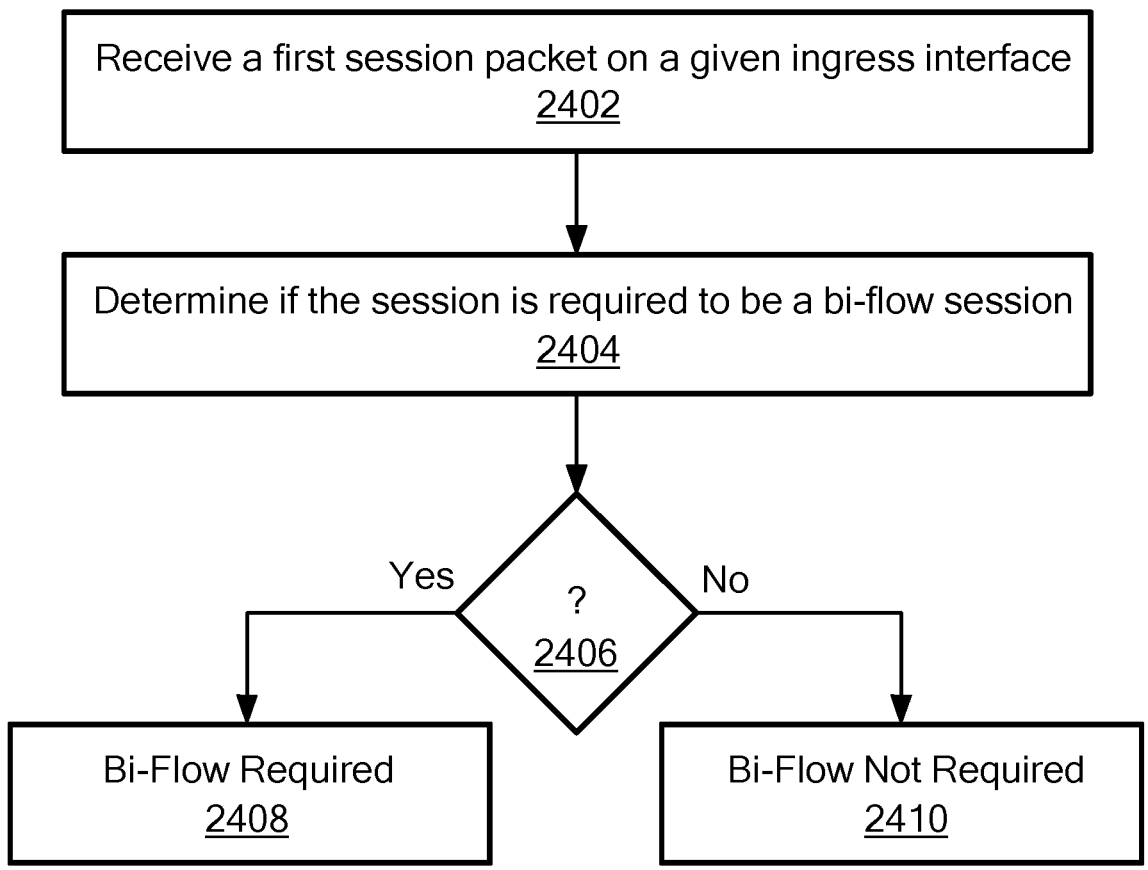
FIG. 24 is a flowchart for first session packet processing, in accordance with one exemplary embodiment.

FIG. 24 is a flowchart for first session packet processing, in accordance with one exemplary embodiment. In block 2402, the AIPR receives a first session packet on a given ingress interface. In block 2404, the AIPR may determine if the session is required to be a bi-flow session, e.g., in embodiments where bi-flow is configurable. If the session is required to be a bi-flow session (YES in block 2406), then the AIPR performs "bi-flow required" processing, in block 2408. If the session is not required to be a bi-flow session (NO in block 2406), then the AIPR performs "bi-flow not required" processing in block 2410. It should be noted that some embodiments will simply proceed directly from block 2402 to block 2408, e.g., if the AIPR is "hard-coded" to make all sessions bi-flow.

Figure 25:
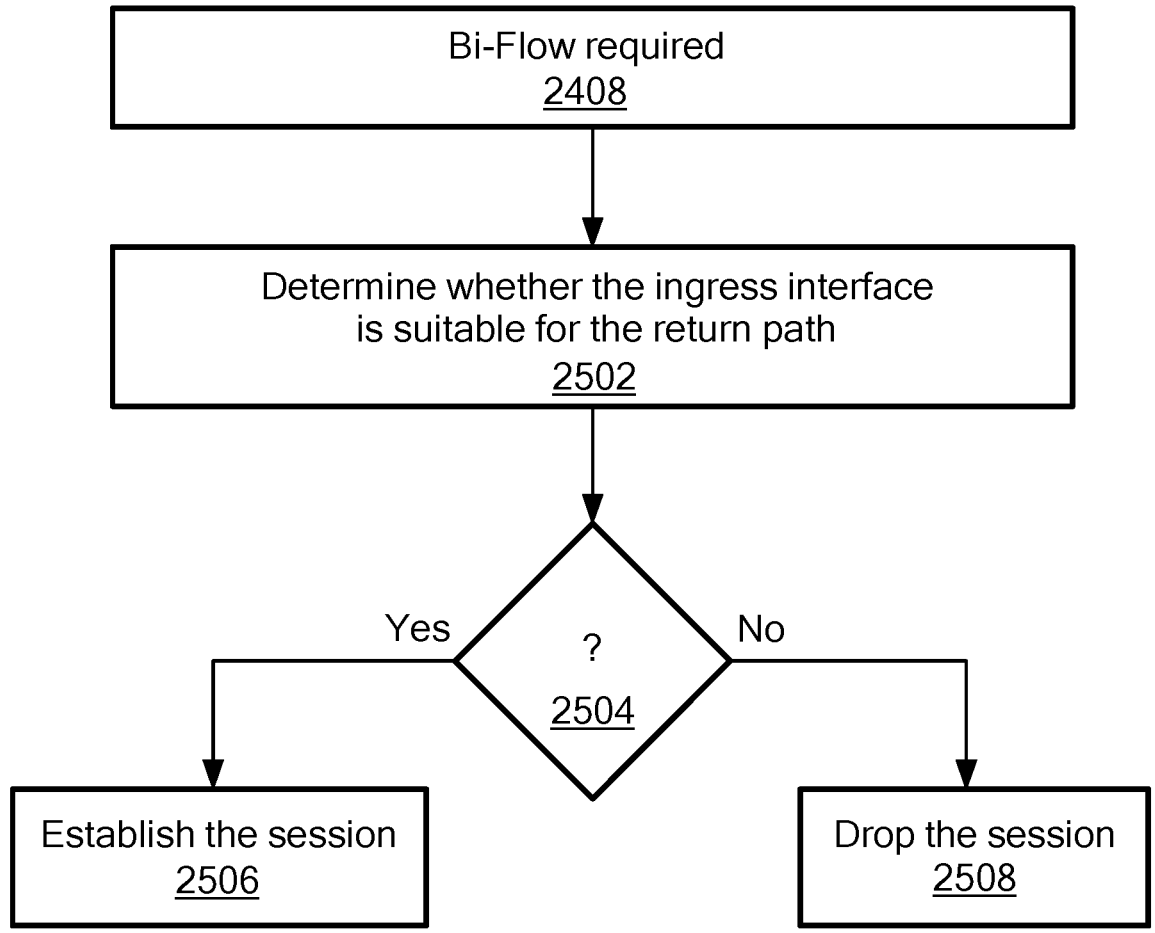
FIG. 25 is a flowchart for "bi-flow required" processing pursuant to FIG. 24, in accordance with one exemplary embodiment.

FIG. 25 is a flowchart for "bi-flow required" processing pursuant to block 2408 of FIG. 24, in accordance with one exemplary embodiment. In block 2502, the AIPR determines whether the ingress interface is suitable for the return path. If the ingress interface is suitable for the return path (YES in block 2504), then the AIPR continues to establish the session using the ingress interface for the return path, in block 2506. If the ingress interface is not suitable for the return path (NO in block 2504), then the AIPR drops the session, in block 2508.

Figure 29:
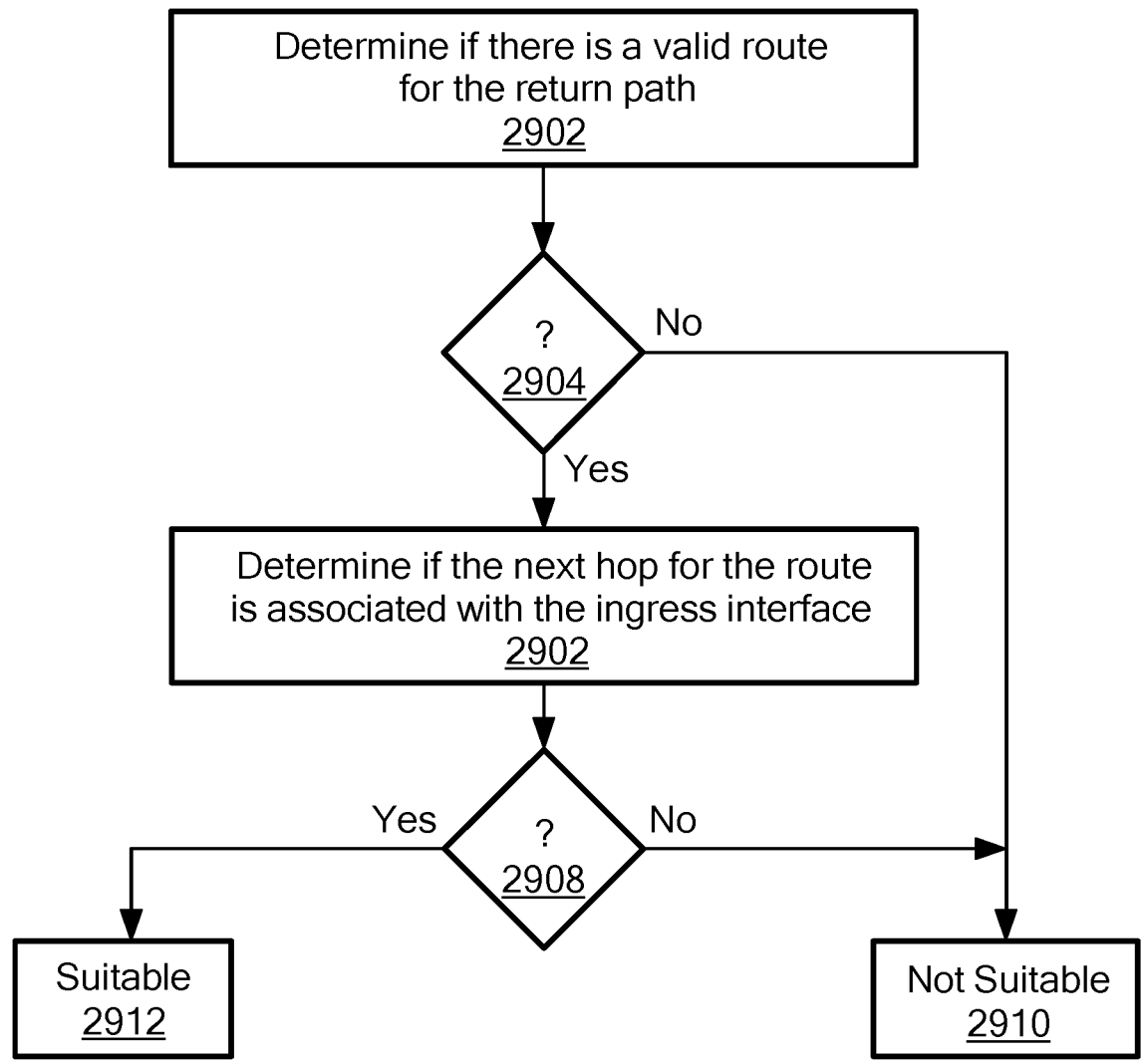
FIG. 29 is a flowchart for determining if an ingress interface is suitable for a return path, in accordance with one exemplary embodiment.

FIG. 29 is a flowchart for determining if the ingress interface is suitable for the return path pursuant to block 2502 of FIG. 25, in accordance with one exemplary embodiment. In block 2902, the AIPR determines if there is a valid route for the return path. If there is no valid route for the return path (NO in block 2904), then then ingress interface is not suitable for the return path (block 2910). If there is a valid route for the return path (YES in block 2904), then the AIPR determines if the next hop for the route is associated with the ingress interface, in block 2906. If the next hop for the route is not associated with the ingress interface (NO in block 2908), then the ingress interface is not suitable for the return path (block 2910). If the next hop for the route is associated with the ingress interface (YES in block 2908), then the ingress interface is suitable for the return path (block 2912).

Figure 26:
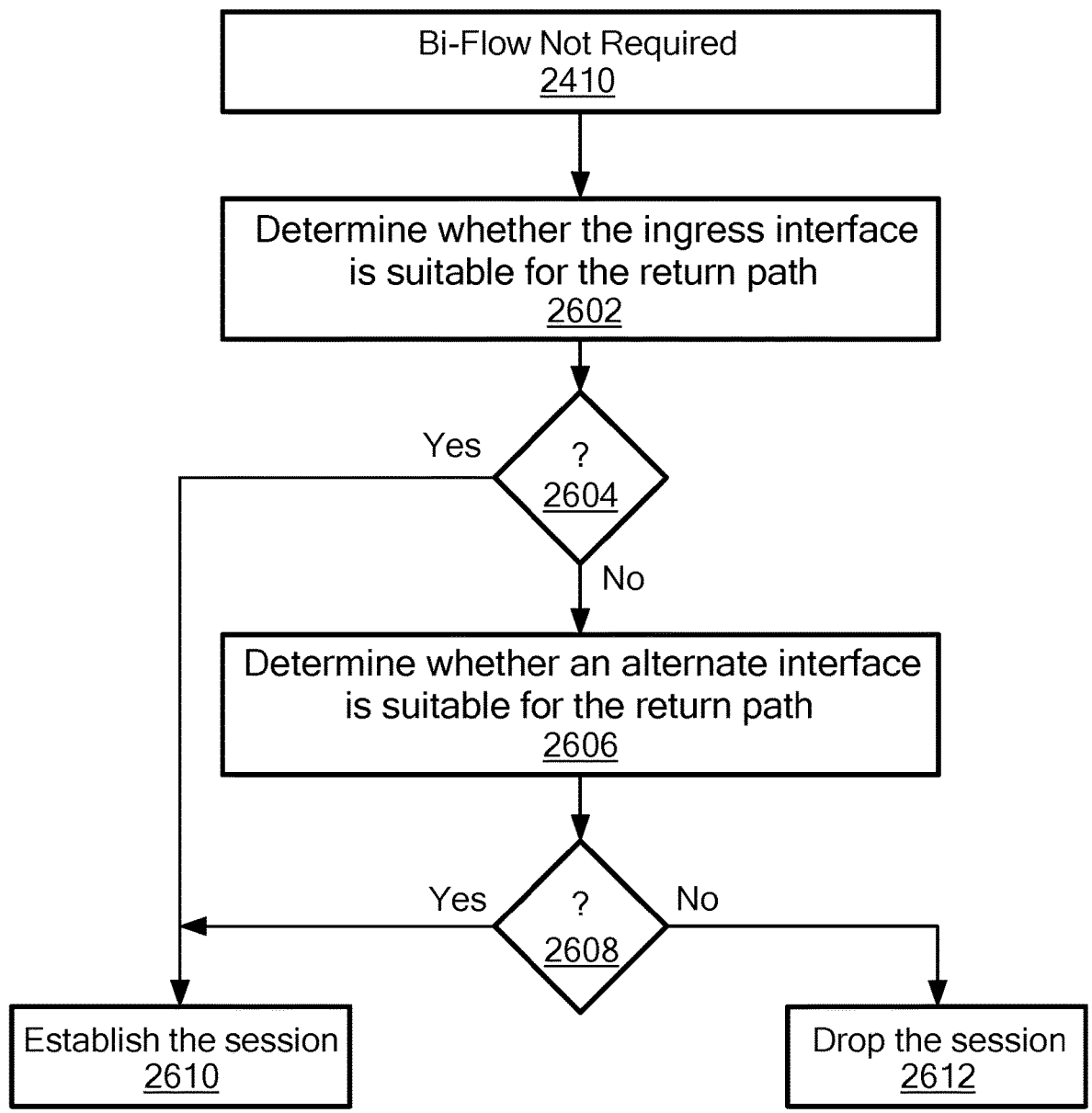
FIG. 26 is a flowchart for "bi-flow not required" processing pursuant to FIG. 24, in accordance with one exemplary embodiment.

FIG. 26 is a flowchart for "bi-flow not required" processing pursuant to block 2410 of FIG. 24, in accordance with one exemplary embodiment. In block 2602, the AIPR determines whether the ingress interface is suitable for the return path. If the ingress interface is suitable for the return path (YES in block 2604), then the AIPR continues to establish the session using the ingress interface for the return path, in block 2610. If the ingress interface is not suitable for the return path (NO in block 2604), then the AIPR determines whether an alternate interface is suitable for the return path, in block 2606. If an alternate interface is suitable for the return path (YES in block 2608), then the AIPR continues to establish the session using the alternate interface (which may be selected from among a plurality of suitable interfaces), in block 2610. If there is no alternate interface suitable for the return path (NO in block 2608), then the AIPR drops the session, in block 2612.

Figure 27:
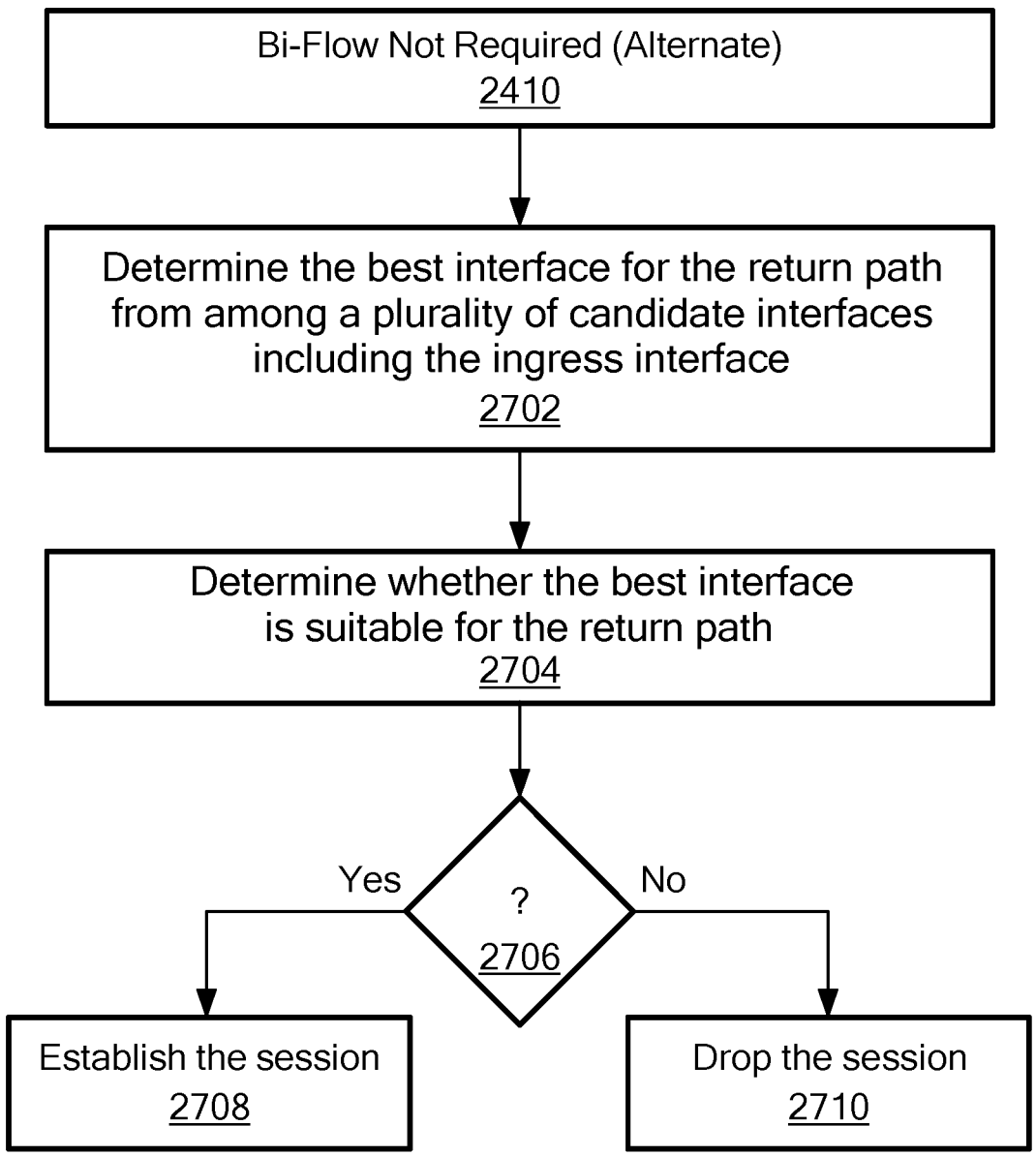
FIG. 27 is a flowchart for "bi-flow not required" processing pursuant to FIG. 24, in accordance with one alternate exemplary embodiment.

FIG. 27 is a flowchart for "bi-flow not required" processing pursuant to block 2410 of FIG. 24, in accordance with one alternate exemplary embodiment. In block 2702, the AIPR determines the best interface for the return path from among a plurality of candidate interfaces including the ingress interface. In block 2704, the AIPR determines whether the best interface is suitable for the return path. If the best interface is suitable for the return path (YES in block 2706), then the AIPR continues to establish the session, in block 2708. If the best interface is not suitable for the return path (NO in block 2706), then the AIPR drops the session, in block 2710. In this way, the AIPR can select the best return path interface if there are a plurality of suitable return path interfaces.

Reverse Forwarding Information Base (FIB)

In certain exemplary embodiments, the AIPR may maintain a reverse forwarding information base (FIB) that contains information for each interface with regard to possible use as a return path. For example the reverse FIB may include performance information (e.g., bandwidth, error rate, latency, etc.) for each interface, in addition to other routing information used to determine if there is a valid return path route for a given session. The AIPR can make reference to the reverse FIB when determining whether a particular interface is suitable for the return path or when selecting an interface from among a plurality of suitable interfaces.

Figure 28:
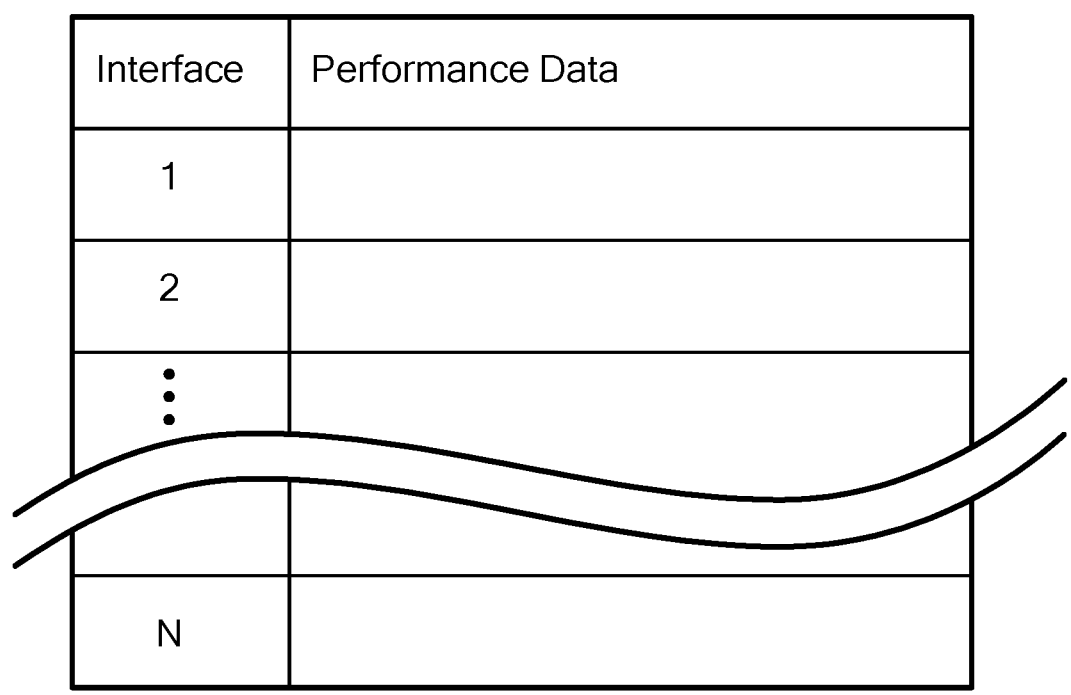
FIG. 28 is a schematic diagram of a reverse forwarding information base, in accordance with one exemplary embodiment.

FIG. 28 is a schematic diagram of a reverse FIB 2800, in accordance with one exemplary embodiment. Here, the reverse FIB 2800 is represented as a table having a row for each interface for storing performance information for the interface. The AIPR may obtain performance information in any of a variety of ways. For example, the AIPR may determine connectivity information by running the Bidirectional Forwarding Detection (BFD) protocol, may run other protocols to determine performance information for each interface, and/or may maintain statistics for packets sent and/or received on each interface.

Link Monitoring Protocols

As discussed above, certain embodiments may include communication link status as part of the reverse FIB for use in determining suitability of a return path for stateful routing. Any of a variety of link monitoring protocols may be used to gather link status information, including, for example, the Bidirectional Forwarding Detection (BFD) protocol described in IETF RFC 5880, which is hereby incorporated herein by reference in its entirety, "Hello" messages, "Ping" messages, "Keep-Alive" messages, or certain routing protocol messages, to name but a few.

In certain exemplary embodiments, certain nodes may exchange link monitoring protocol messages including packet loss detection metadata, as described in 4094/1019, which is hereby incorporated herein by reference. The packet loss detection metadata allows a source node (referred to below as Node N1) to determine the status of both the incoming communication link and the outgoing communication link between itself and an adjacent node (referred to below as Node N2). The source node may be configured to transmit link monitoring protocol messages to a target node including, as metadata, a forward sequence number that the source node increments for each link monitoring protocol message it transmits to the target node. For each link monitoring protocol message received by the target node from the source node, the target node may be configured to return a link monitoring protocol message back to the source node including, as metadata, the forward sequence number from the received link monitoring protocol message and a separate return sequence number that the target node increments for each link monitoring protocol message it returns to the source node. Based on the sequence numbers in the link monitoring protocol messages received back from the target node, the source node can determine if any packets were lost and, if so, also can determine whether the packets were lost on the outgoing communication link to the target node or on the incoming communication link from the target node.

In certain exemplary embodiments, the link monitoring protocol messages may be BFD messages including special packet loss detection metadata, for example, as described in 4094/1019, which is hereby incorporated herein by reference. For convenience, the use of the BFD protocol with added metadata may be referred to herein as "augmented BFD."

The following is an example message flow demonstrating link status monitoring based on packet loss detection, in accordance with one exemplary embodiment. Node N1 transmits a series of link monitoring protocol messages including a message A with forward sequence number 10, message B with forward sequence number 11, and message C with forward sequence number 12. Node N2 transmits return link monitoring protocol messages including message D with forward sequence number 10 and return sequence number 101 in response to message A, message E with forward sequence number 11 and return sequence number 102 in response to message B, and message F with forward sequence number 12 and return sequence number 103 in response to message C. Because Node N1 receives return link monitoring protocol messages in response to all of its transmitted link monitoring protocol messages with proper forward and return sequence numbers (i.e., there are no gaps in either the forward or return sequence numbers, and the sequence numbers are received in sequential order), then Node N1 can infer that there are no failures on either the outgoing communication link or the incoming communication link.

The following is an example message flow demonstrating packet loss detection on the outgoing communication link, in accordance with one exemplary embodiment. Node N1 transmits a series of link monitoring protocol messages including message A with forward sequence number 10, message B with forward sequence number 11, and message C with forward sequence number 12. In this example, Node N2 does not receive message B. Node N2 transmits return link monitoring protocol messages including message D with forward sequence number 10 and return sequence number 101 in response to message A and message E with forward sequence number 12 and return sequence number 102 in response to message C. Thus, Node N1 can infer from received messages D and E that Node N2 did not receive message B because the return sequence number 102 in return message E corresponds to forward message B rather than forward message C. Node N1 therefore can infer that message B was lost on the outgoing communication link to Node N2.

The following is an example message flow demonstrating packet loss detection on the incoming communication link, in accordance with one exemplary embodiment. Here, Node N1 transmits a series of link monitoring protocol messages including message A with forward sequence number 10, message B with forward sequence number 11, and message C with forward sequence number 12. Node N2 transmits return link monitoring protocol messages including message D with forward sequence number 10 and return sequence number 101 in response to message A, message E with forward sequence number 11 and return sequence number 102 in response to message B, and message F with forward sequence number 12 and return sequence number 103 in response to message C. In this example, Node N1 does not receive message E. Thus, Node N1 can infer from received messages D and F that Node N2 received message B but the return message E was lost because return message F includes the correct forward and reverse sequence numbers for responding to message C. Node N1 therefore can infer that message E was lost on the incoming communication link from Node N2.

The following is an example message flow demonstrating detection of an incoming communication link problem, in accordance with one exemplary embodiment. Here, Node N1 transmits a series of link monitoring protocol messages including message A with forward sequence number 10, message B with forward sequence number 11, and message C with forward sequence number 12. Node N2 transmits return link monitoring protocol messages including message D with forward sequence number 10 and return sequence number 101 in response to message A, message E with forward sequence number 11 and return sequence number 102 in response to message B, and message F with forward sequence number 12 and return sequence number 103 in response to message C. In this example, Node N1 receives messages E and F out-of-order, i.e., Node N1 receives message F before receiving message E. Thus, Node N1 can infer from received messages F and E that Node N2 received all forward messages in order and responded to the messages in order but the return messages arrived out-of-order. Node N1 therefore can infer that there was a problem on the incoming communication link from Node N2.

The following is an example message flow demonstrating detection of an outgoing communication link problem, in accordance with one exemplary embodiment. Here, Node N1 transmits a series of link monitoring protocol messages including message A with forward sequence number 10, message B with forward sequence number 11, and message C with forward sequence number 12. In this example, Node N2 receives messages B and C out-of-order, i.e., Node N2 receives message C before receiving message B. Node N2 transmits return link monitoring protocol messages including message D with forward sequence number 10 and return sequence number 101 in response to message A, message E with forward sequence number 12 and return sequence number 102 in response to message C, and message F with forward sequence number 11 and return sequence number 103 in response to message B. Thus, Node N1 can infer from received messages E and F that Node N2 received all forward messages but received messages B and C out-of-order. Node N1 therefore can infer that there was a problem on the outgoing communication link to Node N2.

Thus, the source node may be configured to include a distinct forward sequence number in each distinct forward link monitoring protocol message. The source node also may be configured to receive a series of return link monitoring protocol messages, with each return link monitoring protocol message responsive to a distinct forward link monitoring protocol message and including a forward sequence number from the received forward link monitoring protocol message and a distinct return sequence number. The source node also may be configured to determine if there was a communication problem based on the forward and reverse sequence numbers in the series of received return link monitoring protocol messages. If the source node determines that there was a communication problem, then the source node also may be configured to determine whether the communication problem is associated with the outgoing communication link or the incoming communication link based on the forward and reverse sequence numbers in the series of received return link monitoring protocol messages. The target node may be configured to receive a forward link monitoring protocol message including a distinct forward sequence number, format a return link monitoring protocol message including the distinct forward sequence number and a distinct return sequence number, and transmit the return link monitoring protocol message destined for the source node.

It should be noted that, in each forward link monitoring protocol message, the source node may include a distinct return sequence number from a distinct received return link monitoring protocol message. In this way, the target node would be able to detect certain types of problems on both its outgoing communication link and its incoming communication link based on the forward and return sequence numbers received from the source node. For example, if there is a gap in forward sequence numbers, or if forward sequence numbers are out-of-order, the target node can infer that there was a problem on its incoming communication link. If there is gap in return sequence numbers, of if return sequence numbers are out-of-order, the target node can infer that there was a problem on its outgoing communication link. The target node can store such link status information, e.g., in its routing information base, and can use link status information in the same manner that the source node can use its link status information.

It should be noted that the source node typically transmits forward link monitoring protocol messages at a predetermined frequency (e.g., a message every X seconds or milliseconds, or a set of N messages every M seconds or milliseconds). The frequency at which the messages are sent affects the granularity with which link failure scenarios can be detected, with a higher frequency providing a higher granularity but also consuming more network bandwidth. Thus, different embodiments may use different frequencies.

MISCELLANEOUS

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the REX processor) are necessarily non-conventional because, absent special programming or configuration, the conventional components do not inherently perform the described non-conventional functions.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A router comprising:
   an interface; and
   processing circuitry having access to a memory, the processing circuitry configured to:
      receive, via the interface, a packet of a forward packet flow;
      determine that the router does not store a valid route for forwarding packets of a reverse packet flow for the forward packet flow via a first candidate interface;
      based at least in part on determining that the router does not store the valid route for forwarding packets of the reverse packet flow via the first candidate interface, determine that the router stores a valid route for forwarding packets of the reverse packet flow via a second candidate interface; and based at least in part on determining that the router stores a valid route for forwarding packets of the reverse packet flow via the second candidate interface, establish a stateful routing session using the second candidate interface for the reverse packet flow.

2. The router of claim 1, wherein the processing circuitry is further configured to:

receive a packet of the reverse packet flow; and forward, via the second candidate interface, the packet of the reverse packet flow.

3. The router of claim 1, wherein to establish the stateful routing session, the processing circuitry is configured to:

modify the packet to include metadata specifying a session identifier for the stateful routing session; and forward, to a next-hop for the forward packet flow, the modified packet.

4. The router of claim 1, wherein the interface and the second candidate interface are the same interface.

5. The router of claim 1, further comprising the second candidate interface, wherein the interface and the second candidate interface are different interfaces.

6. The router of claim 1, wherein to determine that the router stores the valid route for forwarding packets of the reverse packet flow via the second candidate interface, the processing circuitry is configured to:

determine that a routing information base (RIB) of the router stores a valid route for forwarding the packets of the reverse packet flow via the second candidate interface.

7. The router of claim 1, wherein to determine that the router stores the valid route for forwarding packets of the reverse packet flow via the second candidate interface, the processing circuitry is configured to:

determine that a next-hop of the route for forwarding the packets of the reverse packet flow is associated with the second candidate interface.

8. The router of claim 1, wherein to determine that the router stores the valid route for forwarding packets of the reverse packet flow via the second candidate interface, the processing circuitry is configured to:

determine that a routing information base (RIB) of the router stores a valid route for forwarding the packets of the reverse packet flow via the second candidate interface; and determine that a next-hop of the route for forwarding the packets of the reverse packet flow is associated with the second candidate interface.

9. A method comprising:

receiving, by a router via an interface of the router, a packet of a forward packet flow;

determining, by the router, that the router does not store a valid route for forwarding packets of a reverse packet flow for the forward packet flow via a first candidate interface;

based at least in part on determining that the router does not store the valid route for forwarding packets of the reverse packet flow via the first candidate interface, determining, by the router, that the router stores a valid route for forwarding packets of the reverse packet flow via a second candidate interface; and based at least in part on determining that the router stores a valid route for forwarding packets of the reverse packet flow via the second candidate interface, establishing, by the router, a stateful routing session using the second candidate interface for the reverse packet flow.

10. The method of claim 9, wherein method further comprises:

receiving, by the router, a packet of the reverse packet flow; and forwarding, by the router and via the second candidate interface, the packet of the reverse packet flow.

11. The method of claim 9, wherein establishing the stateful routing session comprises:

modifying the packet to include metadata specifying a session identifier for the stateful routing session; and forwarding, to a next-hop for the forward packet flow, the modified packet.

12. The method of claim 9, wherein the interface and the second candidate interface are the same interface.

13. The method of claim 9, wherein the interface and the second candidate interface are different interfaces.

14. The method of claim 9, wherein determining that the router stores the valid route for forwarding packets of the reverse packet flow via the second candidate interface comprises:

determining that a routing information base (RIB) of the router stores a valid route for forwarding the packets of the reverse packet flow via the second candidate interface.

15. The method of claim 9, wherein determining that the router stores the valid route for forwarding packets of the reverse packet flow via the second candidate interface comprises:

determining that a next-hop of the route for forwarding the packets of the reverse packet flow is associated with the second candidate interface.

16. Non-transitory, computer-readable media comprising instructions that, when executed, are configured to cause processing circuitry of a router to:

receive, via an interface of the router, a packet of a forward packet flow;

determine that the router does not store a valid route for forwarding packets of a reverse packet flow for the forward packet flow via a first candidate interface;

based at least in part on determining that the router does not store the valid route for forwarding packets of the reverse packet flow via the first candidate interface, determine that the router stores a valid route for forwarding packets of the reverse packet flow via a second candidate interface; and based at least in part on determining that the router stores a valid route for forwarding packets of the reverse packet flow via the second candidate interface, establish a stateful routing session using the second candidate interface for the reverse packet flow.

17. The computer-readable media of claim 16, wherein the instructions are further configured to cause the processing circuitry to:

receive a packet of the reverse packet flow; and forward, via the second candidate interface, the packet of the reverse packet flow.

18. The computer-readable media of claim 16, wherein to establish the stateful routing session, the instructions are configured to cause the processing circuitry to:

modify the packet to include metadata specifying a session identifier for the stateful routing session; and forward, to a next-hop for the forward packet flow, the modified packet.

\* \* \* \* \*